(12) United States Patent
Yamada et al.

(10) Patent No.: US 7,533,394 B2
(45) Date of Patent: May 12, 2009

(54) DISK RECORDING AND/OR REPRODUCTION APPARATUS

(75) Inventors: Takahiro Yamada, Saitama (JP); Kazuhito Kurita, Kanagawa (JP); Mikinori Matsuda, Kanagawa (JP); Toru Morikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 535 days.

(21) Appl. No.: 11/110,809

(22) Filed: Apr. 21, 2005

(65) Prior Publication Data

US 2005/0251817 A1 Nov. 10, 2005

(30) Foreign Application Priority Data

May 10, 2004 (JP) ............................. 2004-139624

(51) Int. Cl.
*G11B 17/03* (2006.01)

(52) U.S. Cl. .................................................. 720/640

(58) Field of Classification Search ................ 720/637, 720/640, 636, 638, 612, 639, 643, 713, 634; 360/99.06, 99.02

See application file for complete search history.

(56) References Cited

U.S. PATENT DOCUMENTS

| | | | | |
|---|---|---|---|---|
| 5,831,958 | A | * | 11/1998 | Kurita ........................ 720/637 |
| 6,782,547 | B1 | * | 8/2004 | Umesaki et al. ............. 720/674 |
| 2005/0160445 | A1 | | 7/2005 | Ohgi |
| 2005/0248879 | A1 | | 11/2005 | Matsuda et al. |
| 2005/0251816 | A1 | | 11/2005 | Matsuda et al. |
| 2005/0251817 | A1 | | 11/2005 | Yamada et al. |
| 2005/0251819 | A1 | | 11/2005 | Morikawa et al. |
| 2006/0080698 | A1 | | 4/2006 | Kurita et al. |
| 2006/0168597 | A1 | | 7/2006 | Yamada et al. |

FOREIGN PATENT DOCUMENTS

| | | |
|---|---|---|
| JP | 07-085559 | 3/1995 |
| JP | 9-259501 | 10/1997 |
| JP | 9-306135 | 11/1997 |
| JP | 2003-045111 | 2/2003 |
| JP | 2005-108393 | 4/2005 |

* cited by examiner

*Primary Examiner*—Allen T Cao
(74) *Attorney, Agent, or Firm*—Oblon, Spivak, McClelland, Maier & Neustadt, P.C.

(57) ABSTRACT

A recording and/or reproduction apparatus includes a chassis, a recording and/or reproduction device provided on the chassis so as to perform recording and/or reproduction on a disk cartridge, a cartridge holder for holding the disk cartridge, the cartridge holder being supported to be movable between a disk cartridge insertion/draw-out position and a recording/reproduction position relative to the chassis, an eject lever provided to be movable in the direction for insertion and draw-out of the disk cartridge relative to the chassis, a biasing device for biasing the eject lever in a disk cartridge discharging direction, a shutter unlocking member mounted to one side surface of the cartridge holder, and a shutter unlocking member movement restriction portion provided on the chassis and operable to restrict the shutter lock unlocking member from moving in the direction of spacing away from the one side surface when the cartridge holder is located in the recording/reproduction position.

7 Claims, 29 Drawing Sheets

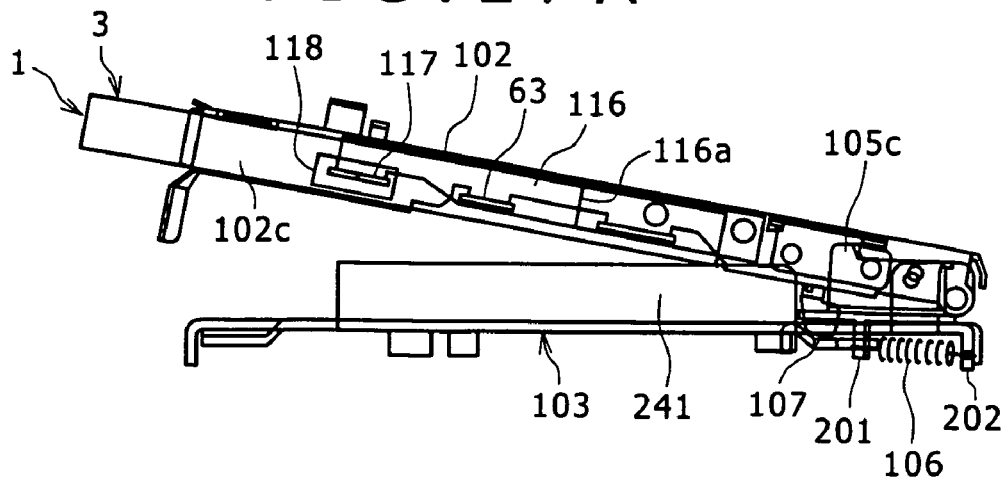
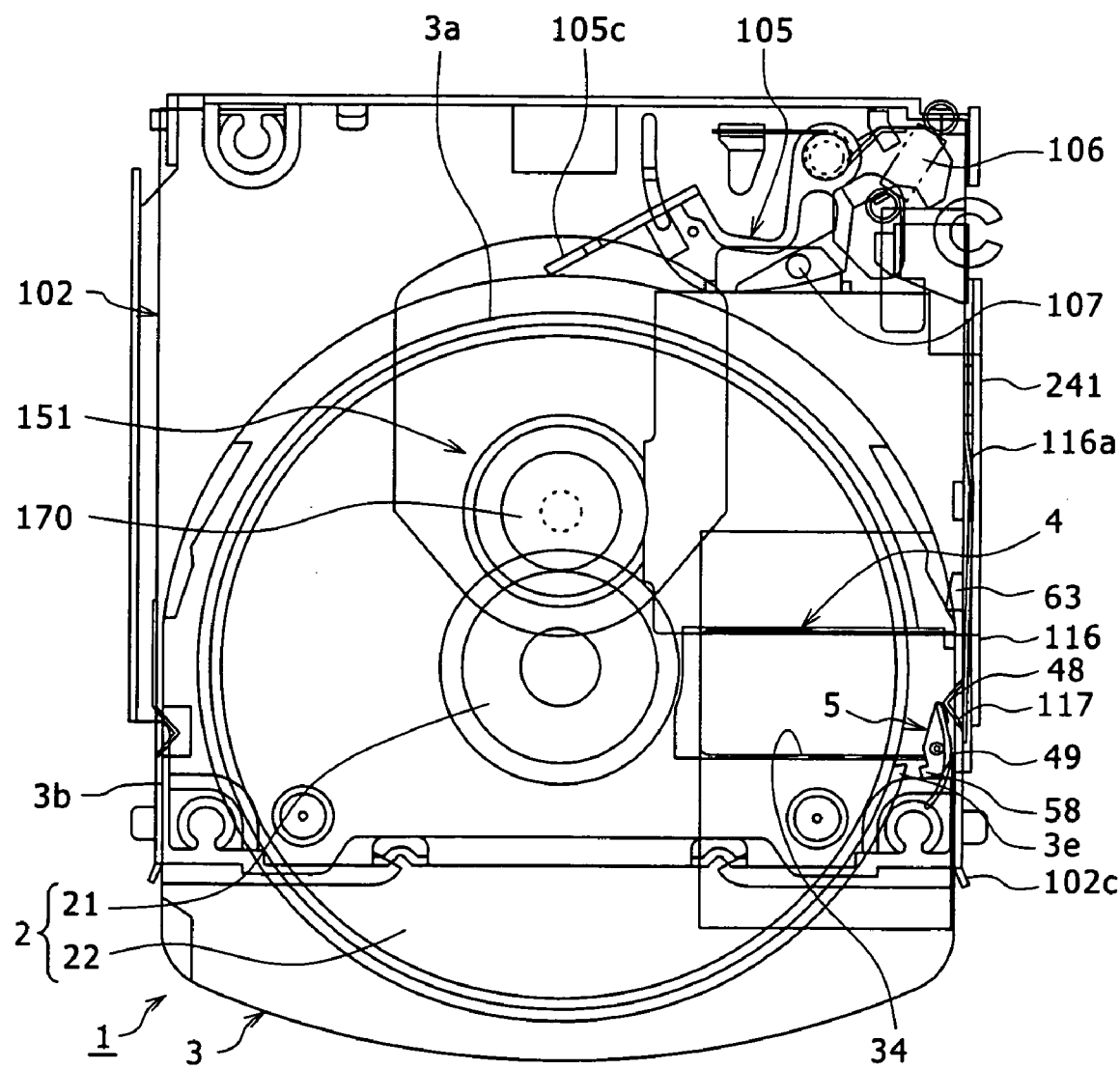

DISK RECORDING AND/OR REPRODUCTION APPARATUS

BACKGROUND OF THE INVENTION

The present invention relates to a disk recording and/or reproduction apparatus in which a disk cartridge can be prevented from slipping off from a cartridge holder under its own force at the time of ejection.

There has been known a disk recording and/or reproduction apparatus in which, as shown in FIG. 35, a leaf spring-made shutter unlocking member 116 is provided in the state of being laid on the outside surface of one side surface 102c of a cartridge holder 102 for holding a disk cartridge 1 inserted therein. The shutter unlocking member 116 is provided with a projected portion 117 at its tip end. At the time of inserting the disk cartridge 1, as shown in FIG. 36, the projected portion 117 is pushed by a side surface of the disk cartridge 1, and the shutter unlocking member 116 is escapingly moved away from the one side surface 102c of the cartridge holder 102. When the disk cartridge 1 is inserted to a predetermined position, as shown in FIG. 37, a shutter movement restriction member 5 is pressingly operated by the projected portion 117, whereby the shutter member 4 is unlocked. At the time of insertion of the disk cartridge 1, when the disk cartridge 1 is biased in the ejection direction by a biasing member, as shown in FIG. 36 again, the projected portion 117 is pushed by the side surface of the disk cartridge 1, and the shutter unlocking member 116 is escapingly moved away from the one side surface 102c of the cartridge holder 102, making it possible to discharge the disk cartridge. In such a disk recording and/or reproduction apparatus, the disk cartridge 1 having been pushed by the biasing member may be driven out of the cartridge holder 102 by its own force at the time of ejection.

In view of the above, there has been developed a disk recording and/or reproduction apparatus having a device for preventing a disk cartridge from being driven out. For example, an apparatus has been known in which a pull plate so guided as to move in parallel in the cartridge insertion direction is provided across a cartridge insertion route, an inserted cartridge is brought into contact with the pull plate, fit holding members for springy fitting in recessed portions of the cartridge are provided on both sides of the pull plate, the cartridge is held relative to the pull plate by the fit holding members, and the pull plate is stopped at a predetermined position by a stopper at the time of discharging (see, for example, Japanese Patent Laid-open No. 2001-189043 (paragraphs 0056 to 0068, and the like)).

The cartridge slip-off preventive device described in Japanese Patent Laid-open No. 2001-189043 has the problem that the use of the pull plate, the fit holding members, the stopper, a lever member and the like leads to an increased number of component parts, a complicated structure and a raised cost.

SUMMARY OF THE INVENTION

There is a need for a disk recording and/or reproduction apparatus capable of securely preventing the slip-off of a disk cartridge by utilizing the above-mentioned shutter unlocking member while having a simple structure and without causing such problems as levitation of the disk cartridge.

According to an embodiment of the present invention, there is provided a recording and/or reproduction apparatus including: a chassis; a recording and/or reproduction section provided on the chassis so as to perform recording and/or reproduction on a disk cartridge; a cartridge holder for holding the disk cartridge, the cartridge holder being supported to be movable between a disk cartridge insertion/draw-out position and a recording/reproduction position relative to the chassis; an eject lever provided to be movable in the direction for insertion and draw-out of the disk cartridge relative to the chassis; a biasing section for biasing the eject lever in a disk cartridge discharging direction; a shutter unlocking member mounted to one side surface of the cartridge holder; and a shutter unlocking member movement restriction portion provided on the chassis and operable to restrict the shutter lock unlocking member from moving in the direction of spacing away from the one side surface when the cartridge holder is located in the recording/reproduction position.

In the recording and/or reproduction apparatus, preferably, when the cartridge holder is moved to the insertion/draw-out position, the shutter unlocking member is moved to a position where the restriction of the movement in the direction of spacing away from the one side surface by the shutter unlocking member movement restriction portion is cancelled.

In the recording and/or reproduction apparatus, preferably, the cartridge holder is provided to be turnable relative to the chassis, and during when the cartridge holder is turned from the recording/reproduction position to the insertion/draw-out position, the movement of the shutter unlocking member in the direction of spacing away from the one side surface is restricted by the shutter unlocking member movement restriction portion.

Preferably, the recording and/or reproduction apparatus further includes a biasing section for biasing the eject lever in the direction of discharging the disk cartridge held by the cartridge holder, wherein when the cartridge holder is moved from the recording/reproduction position to the insertion/draw-out position, the eject lever is moved in the discharging direction by a biasing force of the biasing section, and the disk cartridge held by the cartridge holder is discharged by the eject lever.

In the recording and/or reproduction apparatus, preferably, the shutter unlocking member is provided at its tip end with a projected portion configured to enter into the inside of the cartridge holder, and the shutter unlocking member movement restriction portion restricts the projected portion of the shutter unlocking member into the position in the inside of the cartridge holder when the cartridge holder is located in the recording/reproduction position.

In the recording and/or reproduction apparatus, preferably, an opening portion is provided, and, when the disk cartridge having a shutter member for opening and closing the opening portion is inserted into the cartridge holder, the projected portion is moved in an outward direction relative to the cartridge holder by a side surface of the disk cartridge and is thereafter fitted into the opening portion formed in a side surface of the disk cartridge to thereby cancel the shutter lock of the disk cartridge.

BRIEF DESCRIPTION OF THE DRAWINGS

6B is a plan view showing the same.

FIG. 27A is a side view showing a function of the shutter unlocking member, and FIG. 27B is a plan view showing the same;

DETAILED DESCRIPTION OF THE PREFERRED EMBODIMENT

Now, the disk recording and/or reproduction apparatus according to an embodiment of the present invention will be described below, in the order of (1) general configurations of the system as a whole and essential part, (2) configuration of the disk cartridge, (3) configuration of the cartridge holder, (4) configuration of the chassis, (5) configuration of the recording and/or reproduction device, (6) configuration of the eject lever, (7) configuration of the biasing device and the eject lever locking device, (8) configuration of the unlocking device, (9) configuration of other portions, and (10) functions.

(1) General Configurations of the System as a Whole and Essential Part

Figure 1:
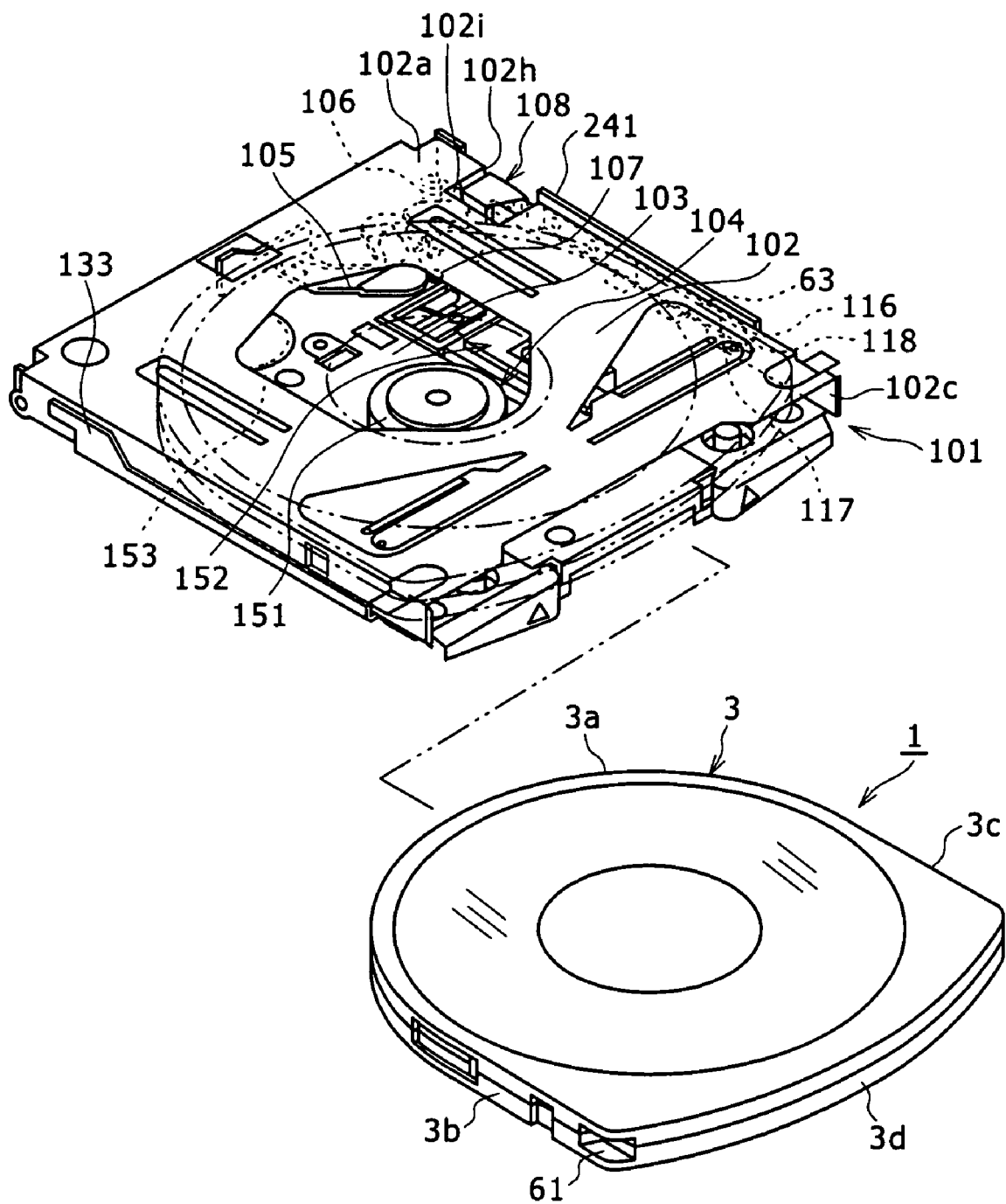
FIG. 1 is a perspective view of a disk recording and/or reproduction apparatus.
Figure 2:
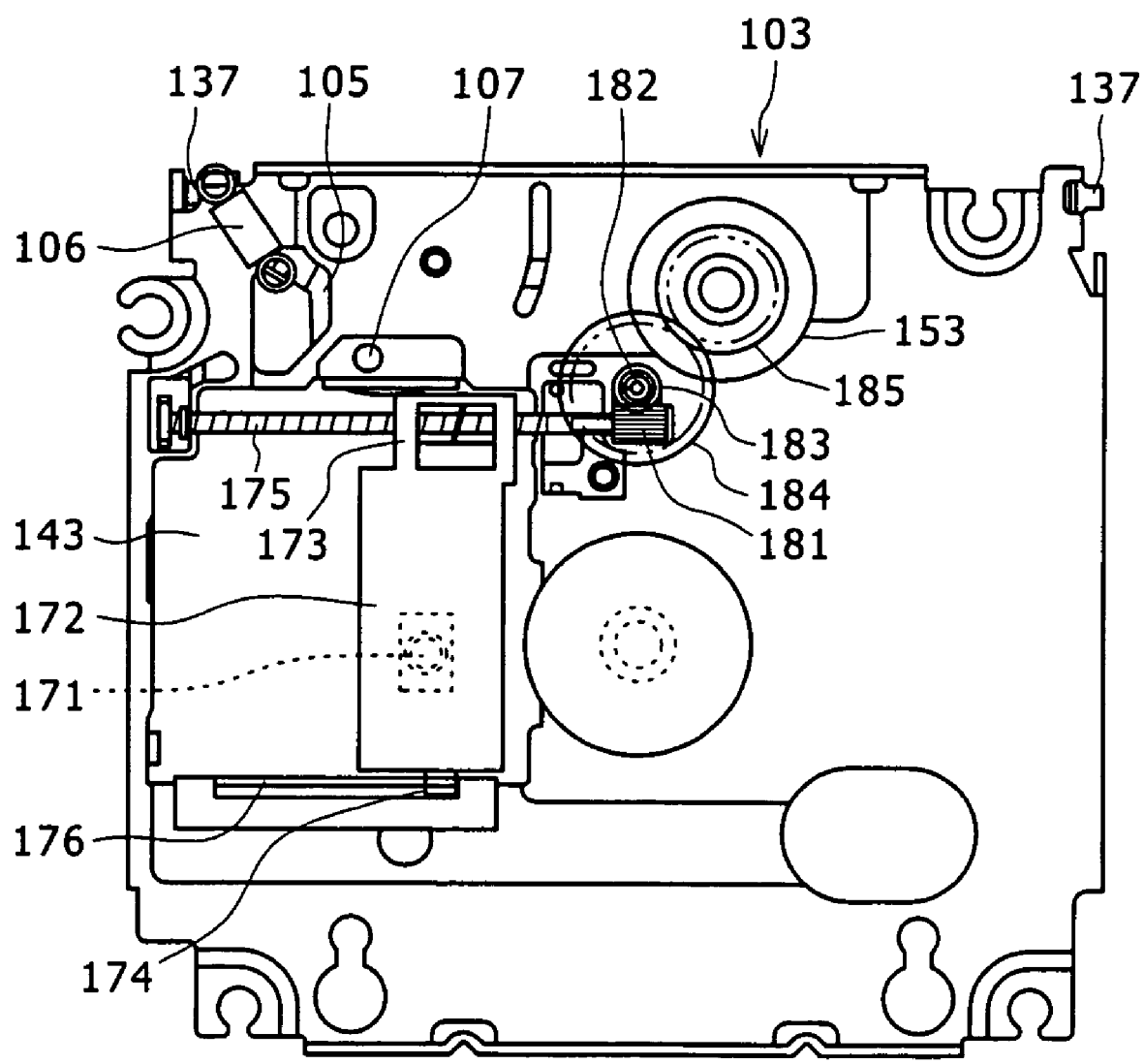
FIG. 2 is a plan view of the disk recording and/or reproduction apparatus as viewed from the back side.
Figure 3:
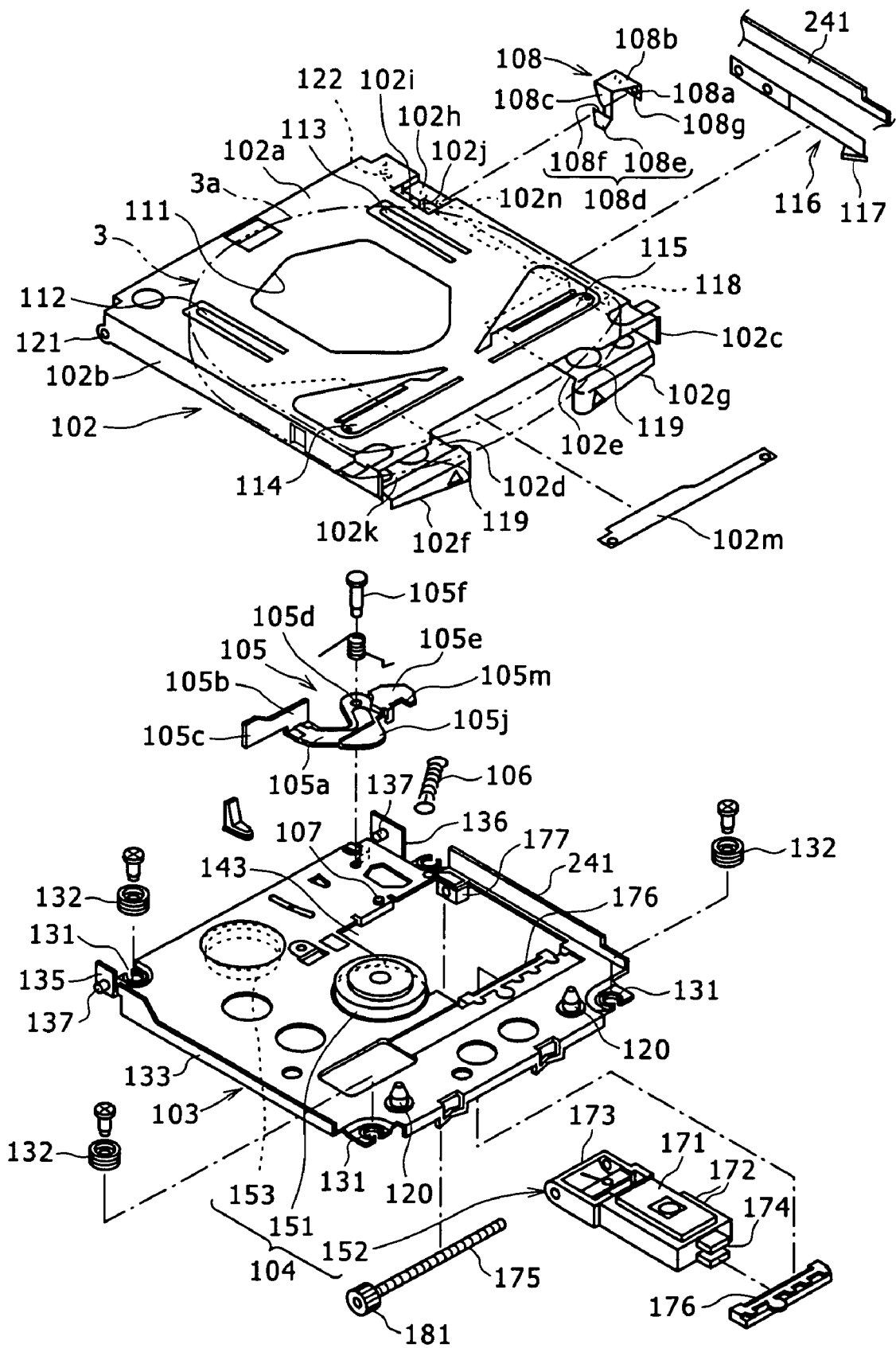
FIG. 3 is an exploded perspective view of the disk recording and/or reproduction apparatus.

FIG. 1 is a perspective view of the disk recording and/or reproduction apparatus according to an embodiment of the present invention, FIG. 2 is a plan view of the same as viewed from the back side, and FIG. 3 is an exploded perspective view of the same. The disk recording and/or reproduction apparatus 101 includes a cartridge holder 102 for holding a disk cartridge 1 inserted therein, a chassis 103 supporting the cartridge holder 102 movably between a cartridge insertion/draw-out position and a recording/reproduction position, a recording and/or reproduction device 104 provided on the chassis 103 so as to perform recording and/or reproduction on the disk cartridge 1, an eject lever 105 provided on the chassis 103 to be capable of turning movement (hereinafter, referred to simply as turning) in the insertion/draw-out direction of the disk cartridge 1 and be movable toward and away from the chassis 103 so as to be turned by being pushed by the disk cartridge 1 being inserted into the cartridge holder 102, a biasing device 106 exerting a turning force in the disk cartridge discharging direction and a biasing force toward the chassis 103 on the eject lever 105, an eject lever locking device 107 locking to the chassis 103 the eject lever 105 which has been turned by the insertion of the disk cartridge 1, and an unlocking device 108 for canceling the locking of the eject lever 105 by the eject lever locking device 107 when the cartridge holder 102 is turned from the recording/reproduction position to the cartridge insertion/draw-out position.

As shown in FIG. 3, a leaf spring-made shutter unlocking member 116 is mounted in the state of being superposed on the outside surface of a second side plate 102c of the cartridge holder 102. The shutter unlocking member 116 is provided at its tip end portion with a projected portion 117 roughly V shaped in plan view. The projected portion 117 enters into the cartridge holder 102 through an opening portion 118 provided in the second side plate 102c of the cartridge holder 102.

Figure 30:
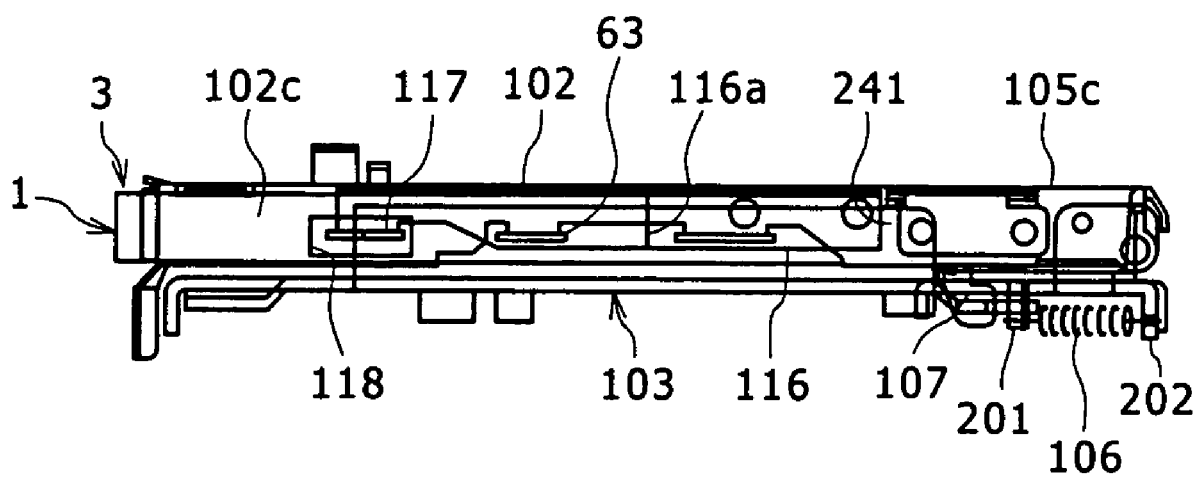
FIG. 30 is a side view of the condition where the cartridge holder is in the recording/reproduction position.
Figure 31A:
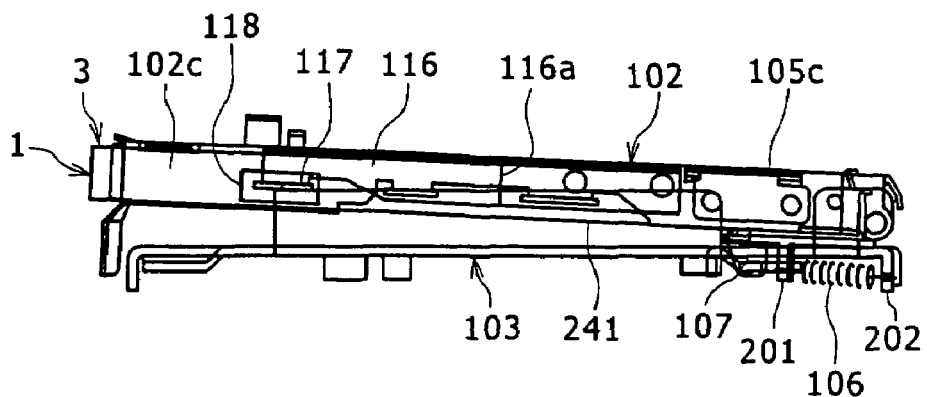
FIG. 31A is a side view of the condition where the cartridge holder has been turned by a predetermined angle from the recording/reproduction position.
Figure 31B:
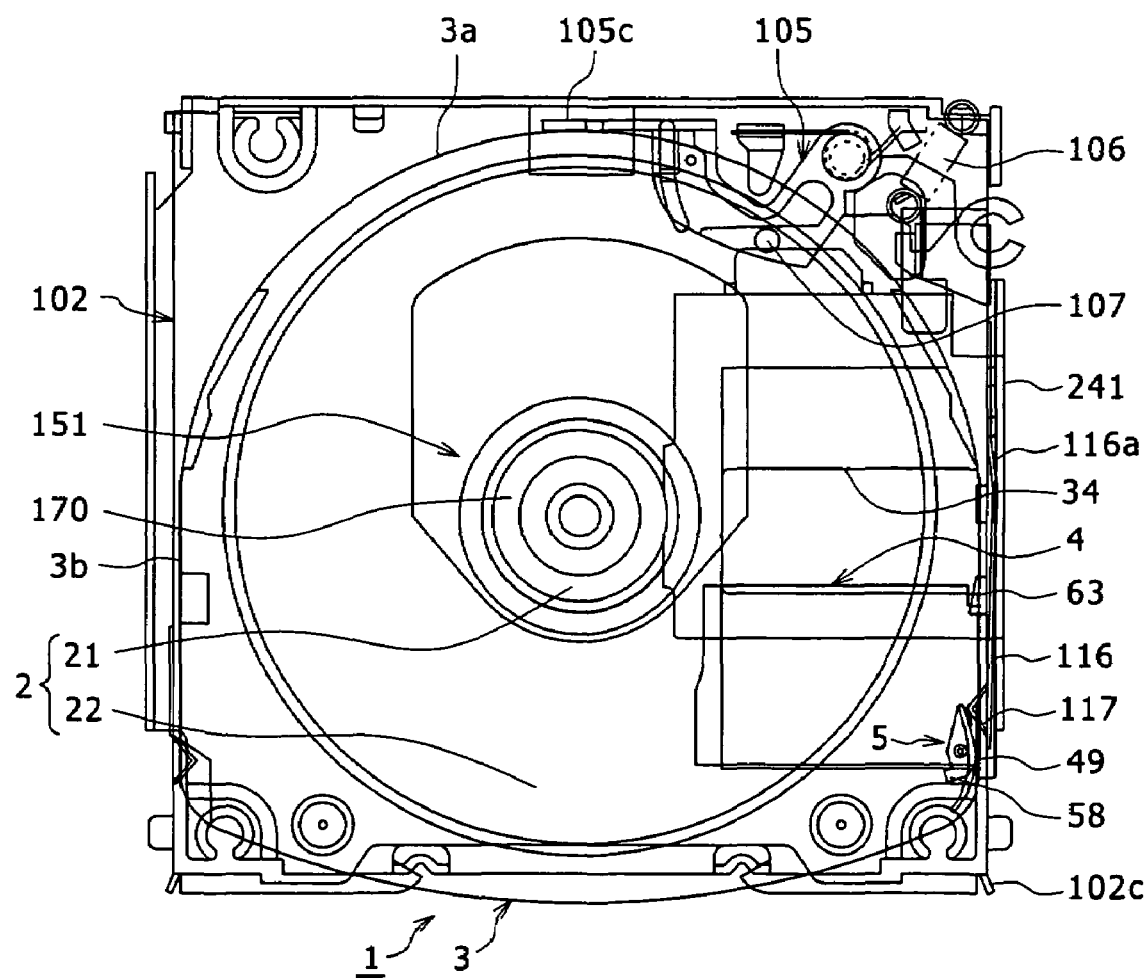
FIG. 31B is a plan view of the same.
Figure 32A:
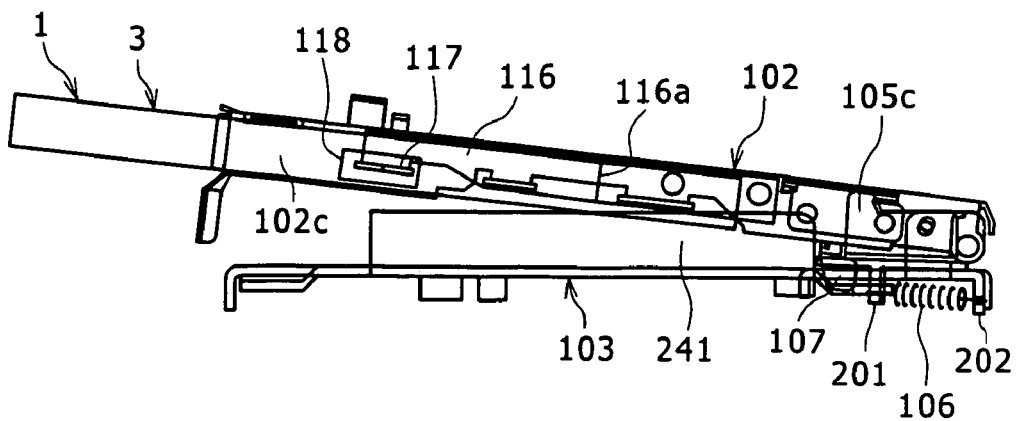
FIG. 32A is a side view of the condition where the restraint of the cartridge holder is canceled.
Figure 32B:
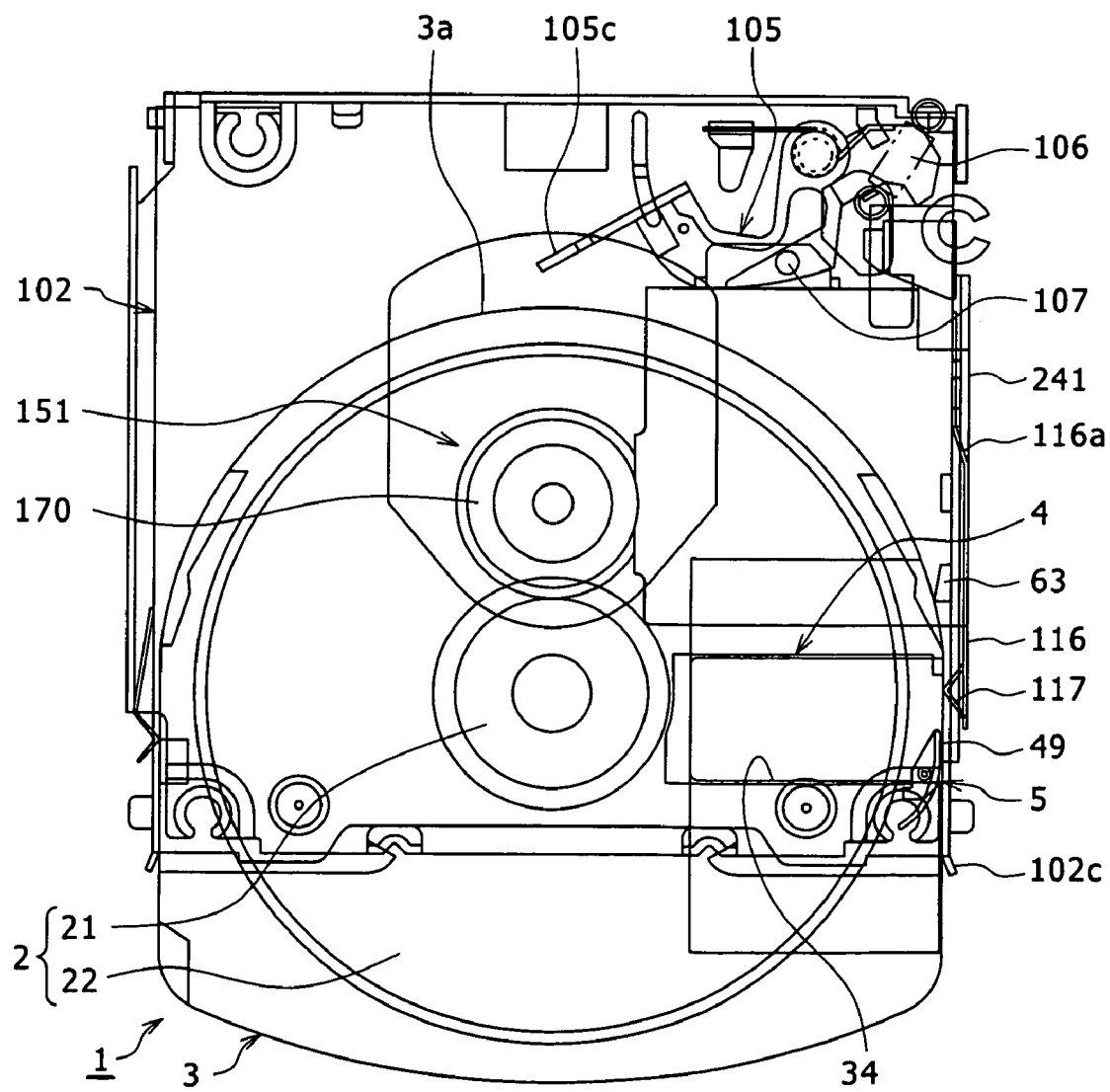
FIG. 32B is a plan view of the same.

As shown in FIGS. 30 and 31, a shutter unlocking member movement restriction portion 241 for restricting (inhibiting) the movement of the shutter unlocking member 116 in the direction of spacing away from the second side plate 102c of the cartridge holder 102 until the movement of the cartridge holder 102 from the recording/reproduction position to the disk cartridge insertion/draw-out position proceeds to an intermediate point and until the reverse movement of the cartridge holder 102 from the disk cartridge insertion/draw-out position to the recording/reproduction position proceeds to an intermediate point is disposed on the outside of the shutter unlocking member 117. The shutter unlocking member movement restriction portion 241 is erected on the chassis 103, and, as shown in FIG. 32, when the cartridge holder 102 is turned further toward the disk cartridge insertion/draw-out position, the restraint of the shutter unlocking member 116 by the shutter unlocking member movement restriction portion 241 is canceled, permitting the shutter unlocking member 116 to move away from the second side plate 102c of the cartridge holder 102. Incidentally, the shutter unlocking member 116 has a bent portion 116a, and the bent portion 116a presses the tip end side of the shutter unlocking member 116 against the second side plate 102c of the cartridge holder 102, whereby a so-called pre-pressure is exerted on the projected portion 117 provided at the tip end portion of the shutter unlocking member 116. When the restraint of the bent portion 116a by the shutter unlocking member movement restriction portion 241 is canceled, the shutter unlocking member 116 is moved away from the second side plate 102c of the cartridge holder 102.

Figure 33A:
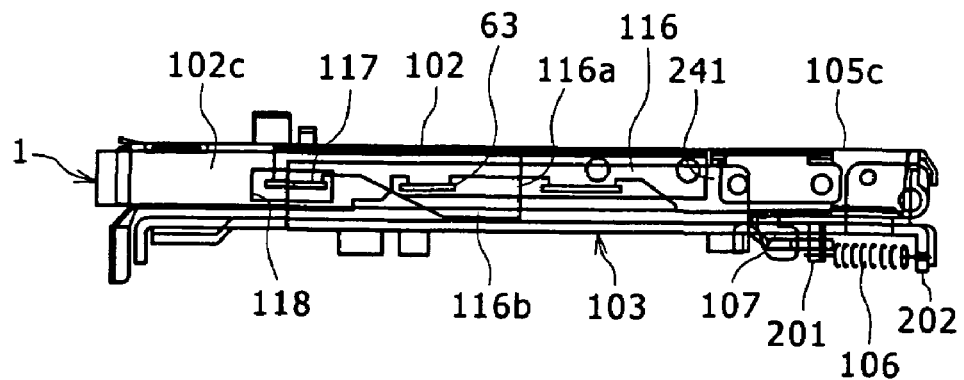
FIGS. 33A, 33B, and 33C are side views showing another embodiment of the shutter unlocking member.
Figure 33B:
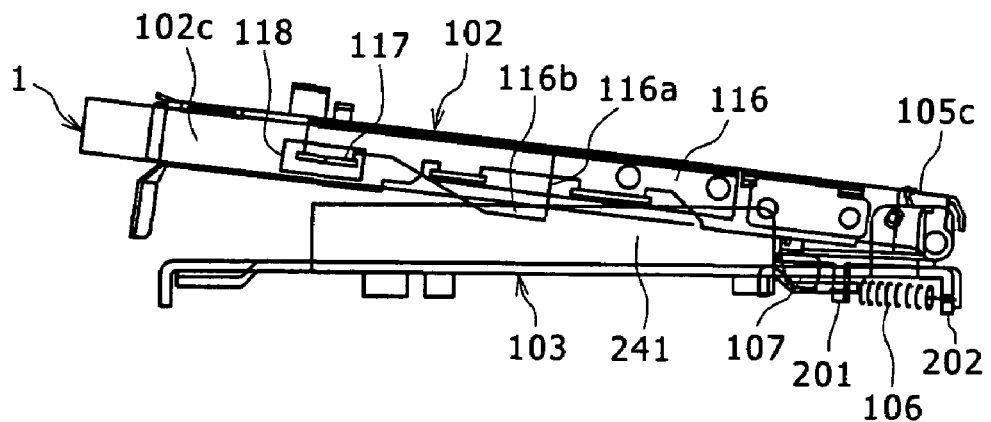
Figure 33C:
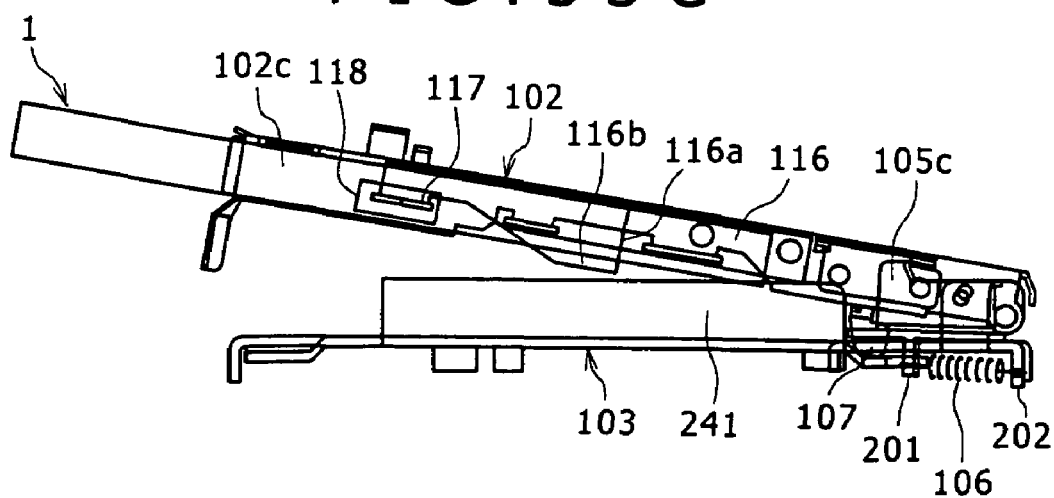

FIG. 33 shows the case where the shutter unlocking member 116 is provided, in the vicinity of the bent portion 116a, an extension portion 116b extended downwards. With the extension portion 116b, the unlocking position of the shutter unlocking member 116 can be located closer to the disk cartridge insertion/draw-out position.

(2) Configuration of the Disk Cartridge

Figure 9:
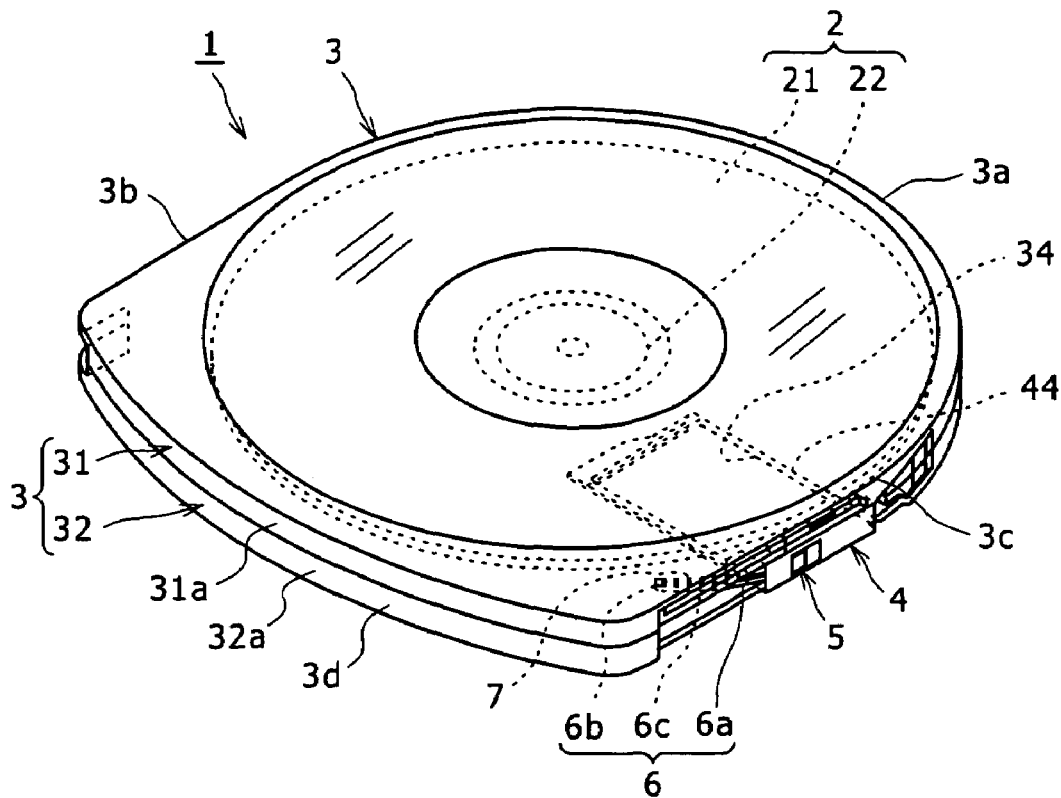
FIG. 9 is a perspective view of a disk cartridge (with the shutter closed)
Figure 10:
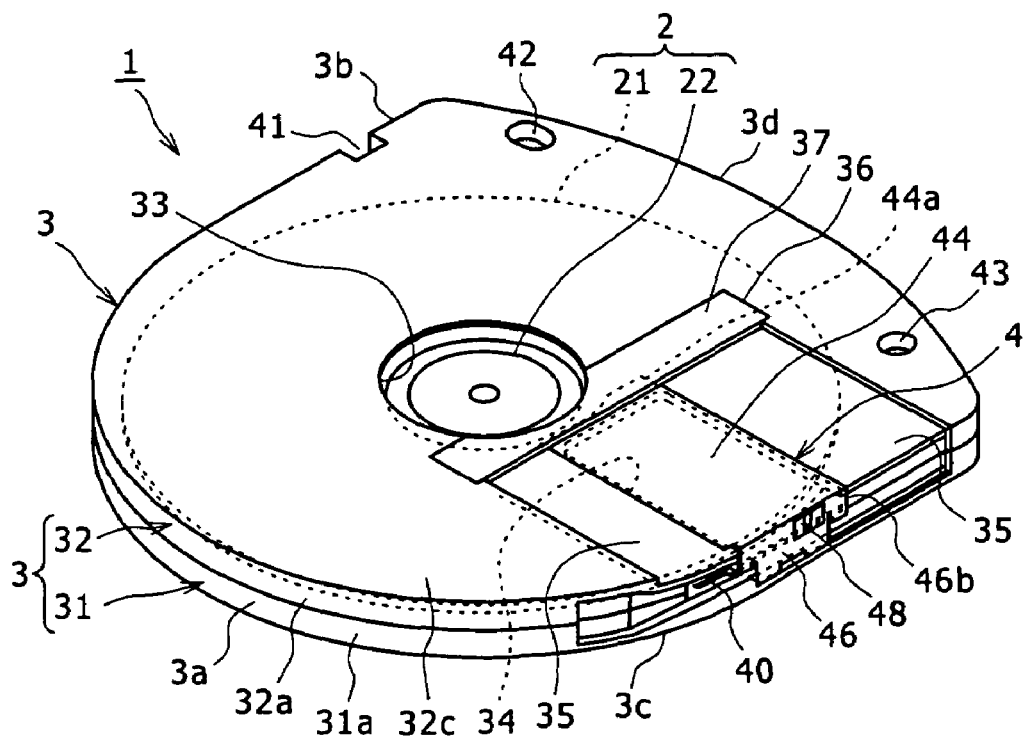
FIG. 10 is a perspective view of the disk cartridge as viewed from the back side (with the shutter closed)
Figure 11:
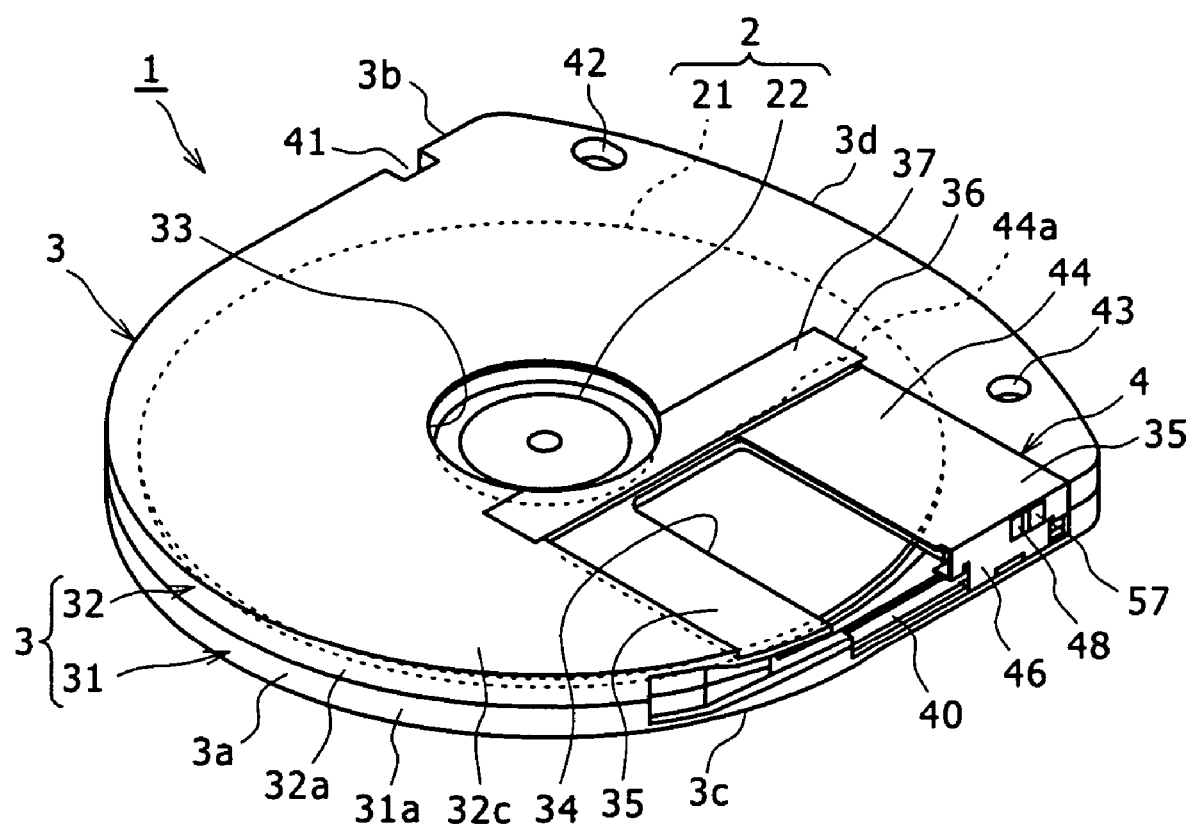
FIG. 11 is a perspective view of the disk cartridge as viewed from the back side (with the shutter closed)

FIG. 9 is a perspective view of the disk cartridge 1 as viewed from the upper half side, FIG. 10 is a perspective view of the disk cartridge 1 as viewed from the lower half side, and FIG. 11 is a perspective view of the disk cartridge 1 in the condition where a recording and/or reproduction opening portion is opened by sliding a shutter member.

The disk cartridge 1 includes a disc-shaped recording medium 2, a cartridge body 3 rotatably containing the disc-shaped recording medium 2 in a circular disk containing portion thereof and provided with a recording and/or reproduction opening portion 34 for causing a part of the disc-shaped recording medium 2 to front on the exterior, a shutter member 4 mounted to the cartridge body 3 so as to be movable between a position for closing the recording and/or reproduction opening portion 34 and a position for opening the recording and/or reproduction opening portion 34, a shutter movement restriction member 5 (see FIG. 14) for restricting the movement of the shutter member 4 in the direction for opening the recording and/or reproduction opening portion 34 by engaging with a movement restriction portion 3e provided in the cartridge body 3 when the shutter member 4 is located at the position for closing the recording and/or reproduction opening portion 34, a biasing member 6 biasing the shutter movement restriction member 5 in the direction for engaging with the movement restriction portion 3e provided in the cartridge body 3, and a deformation preventive portion 7 for preventing the biasing member 6 from being deformed by an external force.

The biasing member 6 has an extension piece 6a extended from one side of the shutter member 4, and an elastic displacement piece 6c formed by folding back so as to be superposed on the inside of the extension piece 6a via a fold-back portion 6b provided at a tip end portion of the extension piece 6a.

The deformation preventive member 7 is disposed on the back side of the tip end portion of the biasing member 6, and supports the biasing member 6 from the back side, thereby preventing the biasing member 6 from being deformed by an external force.

Figure 12:
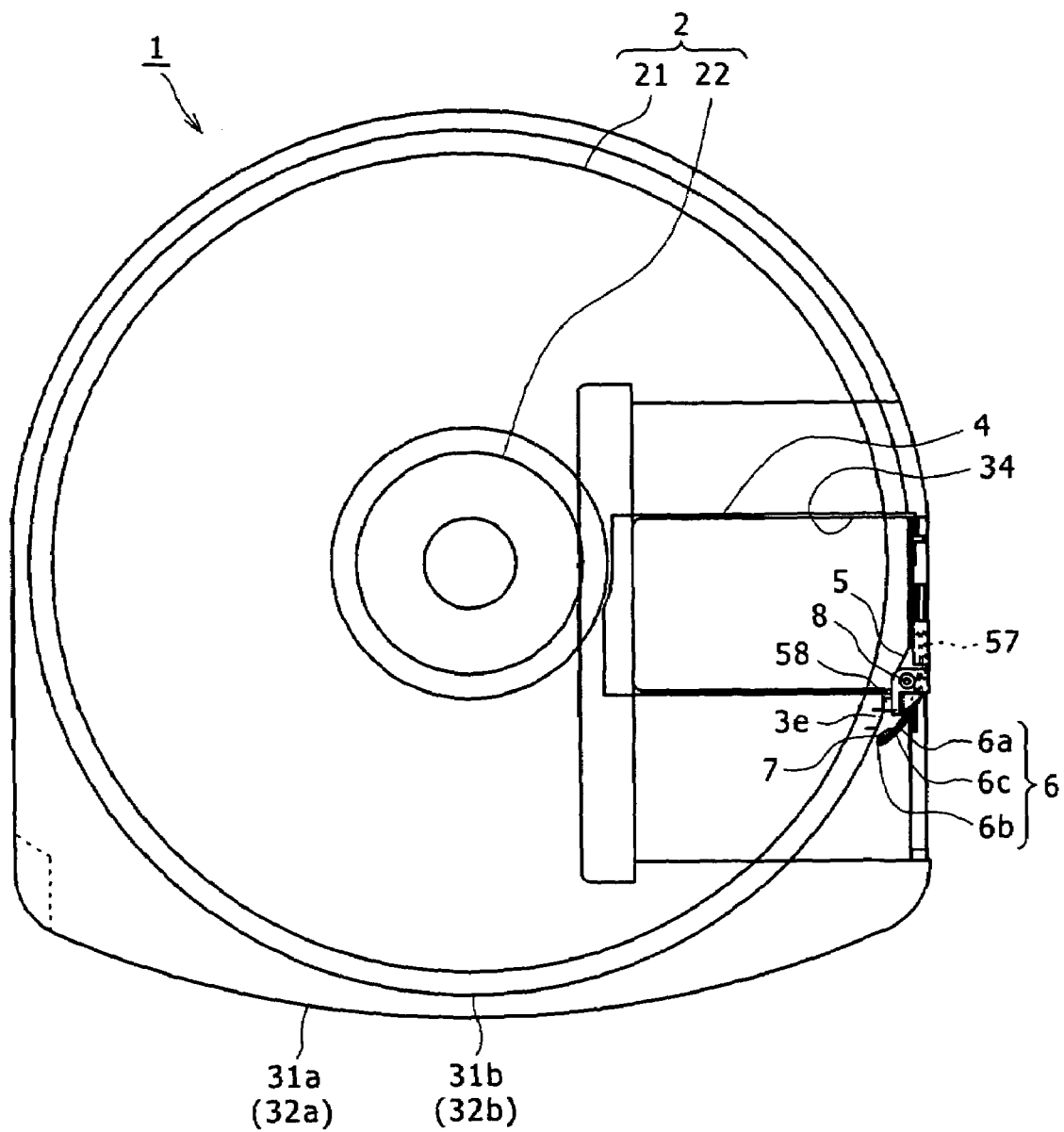
FIG. 12 is a plan view showing the condition where the shutter is locked.
Figure 13:
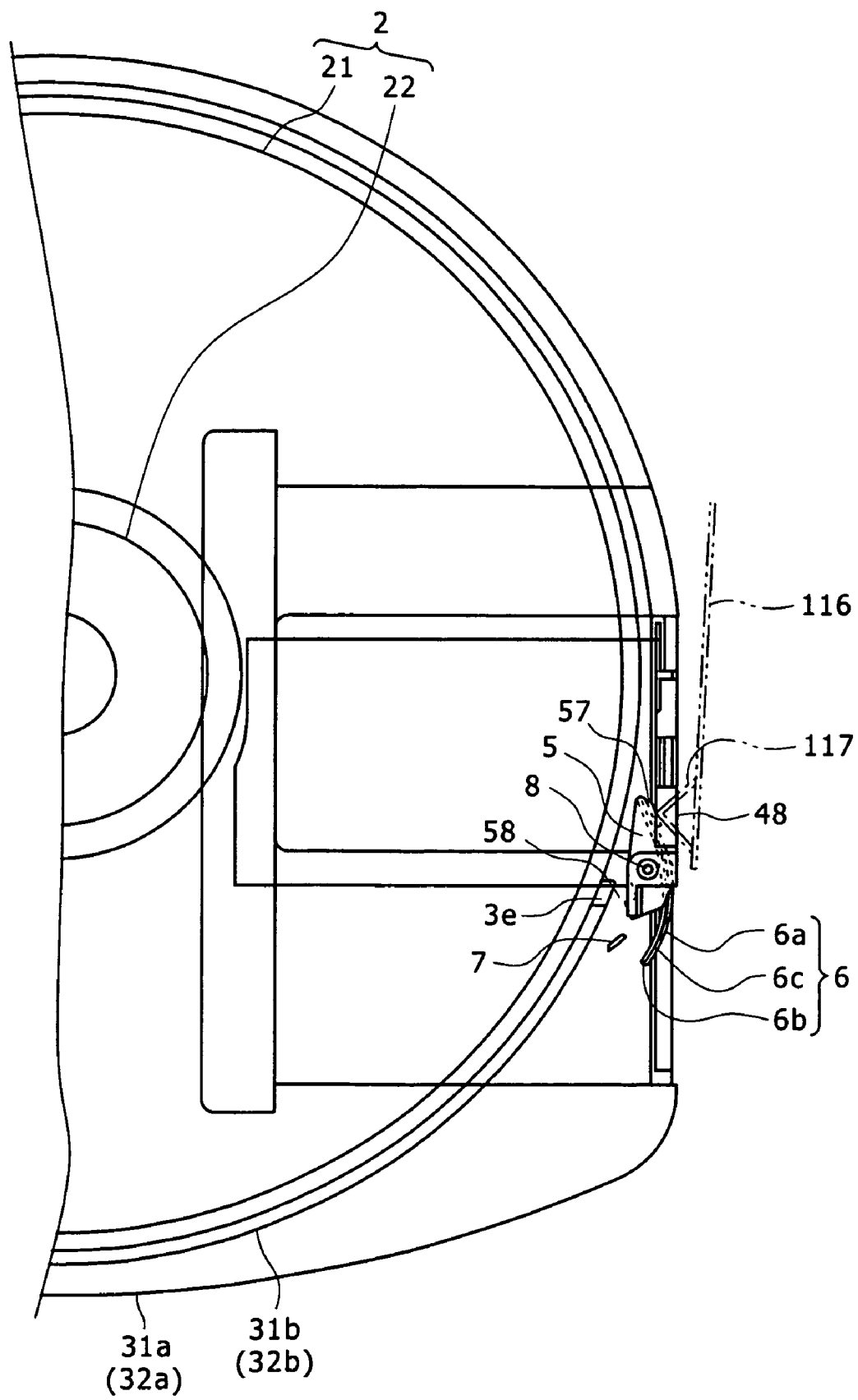
FIG. 13 is a plan view of a major part showing the condition where the shutter is unlocked.

As shown in FIG. 12, in the condition where the shutter member 4 is closing the recording and/or reproduction opening portion 34, the biasing member 6 pushes a pushed portion 57 provided on one end side of the shutter movement restriction member 5, by a tip end portion of the elastic displacement piece 6c, so as to turn the shutter movement restriction member 5 clockwise about a mount shaft 8, whereby an engagement portion 58 provided on the other end side of the shutter movement restriction member 5 is located at such a position as to be capable of engagement with the movement restriction portion 3e provided in the cartridge body 3. When it is tried to move the shutter member 4 in the direction for opening the recording and/or reproduction opening portion 34 under this condition, the engagement portion 58 provided on the other end side of the shutter movement restriction member 5 is engaged with the movement restriction portion 3e provided in the cartridge body 3, to inhibit the movement of the shutter member 4. When the pushed portion 57 is pushed against the projected portion 117 of the shutter unlocking member 116 provided at the second side plate 102c of the cartridge holder 102 (which will be described next) against the biasing force of the elastic displacement piece 6c, the shutter movement restriction member 5 is turned counterclockwise about the mount shaft 8, as shown in FIG. 13, to release the engagement portion 58 to such a position as to be incapable of engagement with the movement restriction portion 3e, thereby permitting the shutter member 4 to move in the direction for opening the recording and/or reproduction opening portion 34.

Now, the disc-shaped recording medium 2, the cartridge body 3, the shutter member 4, the shutter movement restriction member 5, the biasing member 6, and the deformation preventive member 7 will be described in detail below.

As shown in FIG. 9, the disc-shaped recording medium 2 has a chucking hub 22 attached to a central portion of an optical disk 21 on which a game software or the like is recorded. The optical disk 21 is formed to have a small diameter of about 50 mm. The chucking hub 22 is formed of a magnetic metal, such as stainless steel, which is attracted by magnets.

The cartridge body 3 has upper and lower halves 31, 32 whose peripheral walls 31a, 32a are abutted on each other. As shown in FIG. 12, arcuate ribs 31b, 32b for forming a disk containing portion are provided on the inside of the peripheral walls 31a, 32a.

As shown in FIG. 11, of the cartridge body 3, a front surface 3a (a side surface on the side of an insertion end for insertion into the disk recording and/or reproduction apparatus which will be described later) is formed as an arcuate surface (semi-circular surface) having a radius of curvature roughly equal to that of the optical disk 21, left and right surfaces (hereinafter referred to as the first side surface and the second side surface) 3b, 3c continuous with the front surface 3a are formed as flat surfaces parallel to each other, and a rear surface 3d opposite to the front surface 3a is formed as a curved surface curved gradually in continuity with the first and second side surfaces 3b, 3c.

The lower half 32 is provided in its central portion with a drive opening portion 33 through which the hub 22 of the disc-shaped recording medium 2 fronts on the exterior. In addition, the recording and/or reproduction opening portion 34 through which the information recording surface of the optical disk 21 of the disc-shaped recording medium 2 fronts on the exterior is provided in the range from the vicinity of the drive opening portion 33 to the second side surface 3c.

The hub 22 of the disc-shaped recording medium 2 is magnetically chucked onto a disk table 170 of the disk recording and/or reproduction apparatus 101, through the drive opening portion 33. Besides, recording and/or reproduction of information is performed on the optical disk 21 of the disc-shaped recording medium 2 by an optical pickup 152 of the disk recording and/or reproduction apparatus 101, through the recording and/or reproduction opening portion 34.

A recessed form step portion (hereinafter referred to as a first hollow portion) 35 is provided in the range from the outside surface 32c of the lower half 32 to the peripheral wall of the second side surface 3c. The first hollow portion 35 is for mounting the shutter member 4 (which will be described next) without causing the shutter member 4 to protrude from the outside surface 32b of the lower half 32 and the second side surface 3c, more specifically, for mounting the shutter member 4 in the state of being flush with the outside surface 32c of the lower half 32 and the outside surface of the peripheral wall on the side of the second side surface 3c, and is for restricting the moving range of the shutter member 4.

An end portion, on the side of the drive opening portion 33, of the first hollow portion 35 is a second hollow portion 36 deeper than the first hollow portion 35. A folded-back portion 44a provided at the tip end of a port opening/closing portion 44 of the shutter member 4 which will be described next is inserted in the second hollow portion 36. Of the second hollow portion 36, the upper side of the folded-back portion 4a is closed by a shutter guide plate 37 mounted to the lower half 32. In addition, the shutter guide plate 37 prevents the folded-back portion 44a at the tip end of the port opening/closing portion 44 from turning up. Incidentally, the shutter guide plate 37 is also mounted to the lower half 32 in the state of being flush with the outside surface of the lower half 32.

Figure 14:
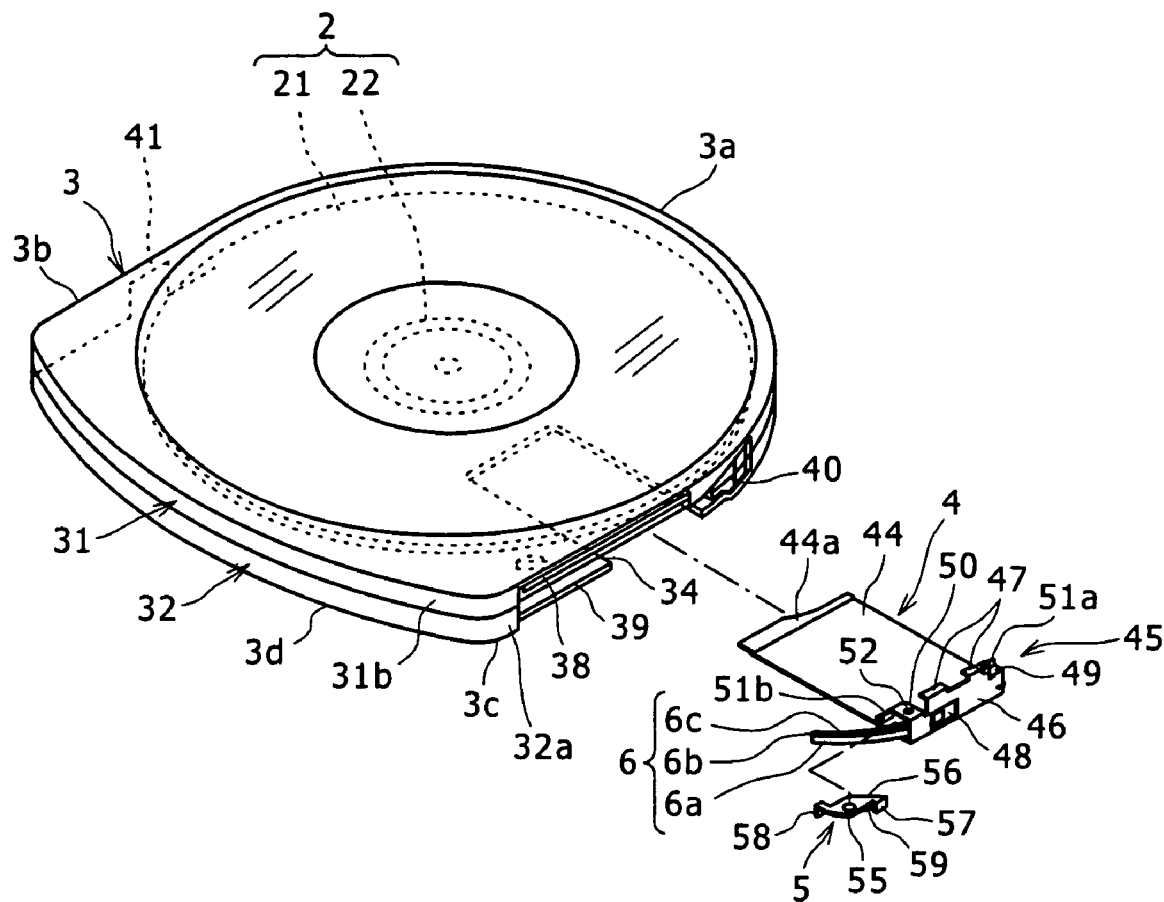
FIG. 14 is an exploded perspective view showing the condition before mounting the shutter.

As shown in FIG. 14, the upper half 31 is provided, in its peripheral wall 31a on the side of the second side surface 3c, with a guide groove 38 extending in the moving direction of the shutter member 4. In addition, the peripheral wall 32a of the lower half 32 is eliminated on the side of the second side surface 3c, to form a shutter member guide opening portion 39 between the lower half 32 and the peripheral wall 31a, on the side of the second side surface 3c, of the upper half 31.

Besides, a shutter unlocking member introduction groove 40 continuous with the shutter member guide opening portion 39 is formed in the range from the second side surface 3c to the front surface 3a of the cartridge body 3. In addition, the other side surface of the cartridge body 3, i.e., the first side surface 3b is provided with a function expansion groove 41. Besides, as shown in FIG. 11, the outside surface, on the side of the front surface 3a, of the lower half 32 is provided with a pair of positioning holes 42, 43.

As shown in FIG. 14, the shutter member 4 includes the flat plate-like port opening/closing portion 44 for opening and closing the recording and/or reproduction opening portion 34, and a mounting portion 45 for mounting the port opening/closing portion 44 onto the cartridge body 3 in the state of being superposed on the first hollow portion 35 of the lower half 32 so that the port opening/closing portion 44 is movable between a position for opening the recording and/or reproduction opening portion 34 and a position for closing the recording and/or reproduction opening portion 34.

The mounting portion 45 includes a first movement guide piece 46 formed by bending roughly perpendicularly one end side of the port opening/closing portion 44, and second movement guide pieces 47 formed by bending tip end portions of the first movement guide piece 46 roughly perpendicularly in the same direction as the port opening/closing portion 44.

The first movement guide piece 46 is provided in its central portion with a pushing operative opening portion 48 on which the pushed portion 57 of the shutter movement restriction member 5 which will be detailed below fronts. The first movement guide piece 46 is provided, at its both end portions in the shutter movement direction and roughly central portions in the thickness direction of the cartridge body 3, with third and fourth movement guide pieces 49, 50 roughly parallel to the second movement guide pieces 47. The third and fourth movement guide pieces 49, 50 are provided at their tip end portions with slip-off preventive pieces 51a, 51b extending in the direction away from the port opening/closing portion 44. In addition, a boss-like shaft portion 52 for turnably mounting the shutter movement restriction member 5 is provided on the lower surface of the fourth movement guide piece 50. Besides, the port opening/closing portion 44 is provided, at its end portion on the opposite side of the mounting portion 45, with a turn-up preventive folded portion 44a. The shutter member 4 is formed by bending a metal sheet blanked into a predetermined shape.

Figure 16:
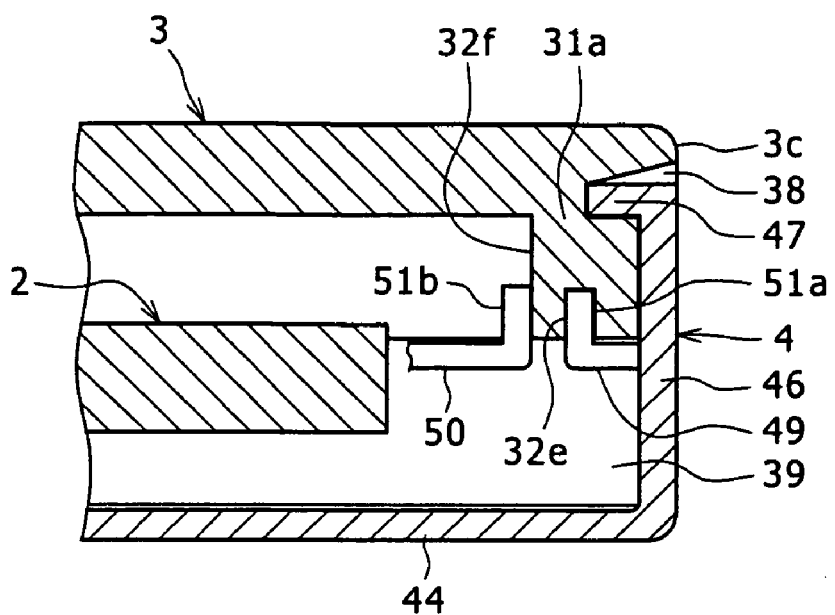
FIG. 16 is a sectional view of the shutter in the mounted state.

As shown in FIG. 16, the shutter member 4 is slidably mounted to the side of the second side surface 3c of the cartridge body 3 by a method in which the second movement guide pieces 47 are inserted into the guide groove 38 provided in the upper half 31 in the condition where the first movement guide piece 46 is laid in the inside of the shutter unlocking member introduction groove 40 in the second side surface 3c of the cartridge body 3, the third and fourth movement guide pieces 49, 50 are inserted into the cartridge body 3 through the shutter member guide opening portion 39, the slip-off preventive piece 51a provided at the tip end of the third movement guide piece 49 is engaged with the groove 32e provided in the bottom surface of the peripheral wall 31a of the upper half 31, and the slip-off preventive piece 51b provided at the tip end of the fourth movement guide piece 50 is engaged with the inside surface 32f of the peripheral wall 31a of the upper half 31.

As shown in FIG. 10, when the shutter member 4 is slid to the side of the front surface 3a of the cartridge body 3, the port opening/closing portion 44 of the shutter member 4 closes the recording and/or reproduction opening portion 34. In addition, as shown in FIG. 11, when the shutter member 4 is slid to the side of the front surface 3a of the cartridge body 3, the recording and/or reproduction opening portion 34 is opened.

Figure 15:
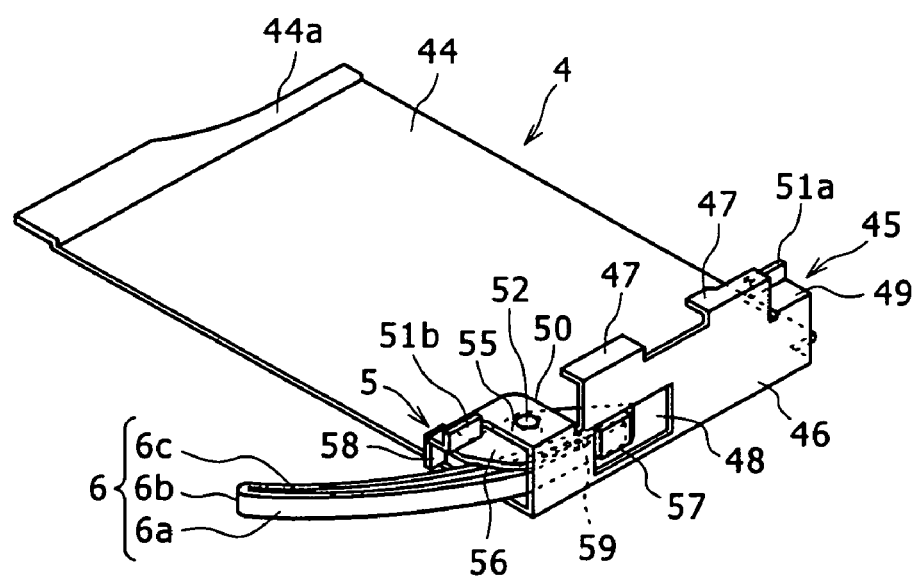
FIG. 15 is a perspective view showing the condition where a shutter movement restriction member is mounted to the shutter.

As shown in FIGS. 14 and 15, the shutter movement restriction member 5 includes a flat plate-like body portion 56 provided with a bearing hole 55 in its central portion, a pushed portion 57 provided at one end portion of the body portion 56, and an engagement portion 58 provided at the other end portion of the body portion 56, and the body portion 56 is provided with a turning inhibitive projected portion 59 at its end portion on the side of the pushed portion 57. The pushed portion 57 and the engagement portion 58 are formed by bending one end portion and the other end portion of the body portion 56 roughly perpendicularly in the same direction. The shutter movement restriction member 5 is formed by bending a metal sheet blanked into a predetermined shape.

The shutter movement restriction member 5 is turnably mounted to the fourth movement guide piece 50 by a method in which the boss-like shaft portion 52 provided on the fourth movement guide piece 50 of the shutter member 4 is inserted into the bearing hole 55. When the shutter movement restriction member 5 is turned until the turning inhibitive projected portion 59 abuts on the inside surface of the first movement guide piece 46 of the shutter member 4, the pushed portion 56 fronts on the pushing operative opening portion 48 provided in the central portion of the first movement guide piece 46 of the shutter member 4 as shown in FIG. 11, and the engagement portion 58 becomes engageable with the movement restriction portion 3e provided in the cartridge body 3 as shown in FIG. 12, whereby movement of the shutter body 4 is inhibited.

As has been described above, the biasing member 6 includes the extension piece 6a extended from one side of the shutter member 4, and the elastic displacement piece 6c formed by folding back through the fold-back portion 6b provided at the tip end portion of the extension piece 6a. (see FIG. 14)

The extension piece 6a is so bent as to enter into the cartridge body 3 via the shutter member guide opening portion 39 when the shutter member 4 is mounted onto the cartridge body 3. The elastic displacement piece 6c is folded back in the state of being so bent as to lie on the inside surface of the extension piece 6c, and its tip end portion pushes the pushed portion 57 provided on one end side of the shutter movement restriction member 5, whereby the pushed portion 57 is made to front on the pushing operative opening portion 48 provided in the central portion of the first movement guide piece 46 of the shutter member 4. The extension piece 6a makes it possible to adjust the spring constant of the biasing member 6 by enlarging the length of the elastic displacement piece 6c.

Figure 17:
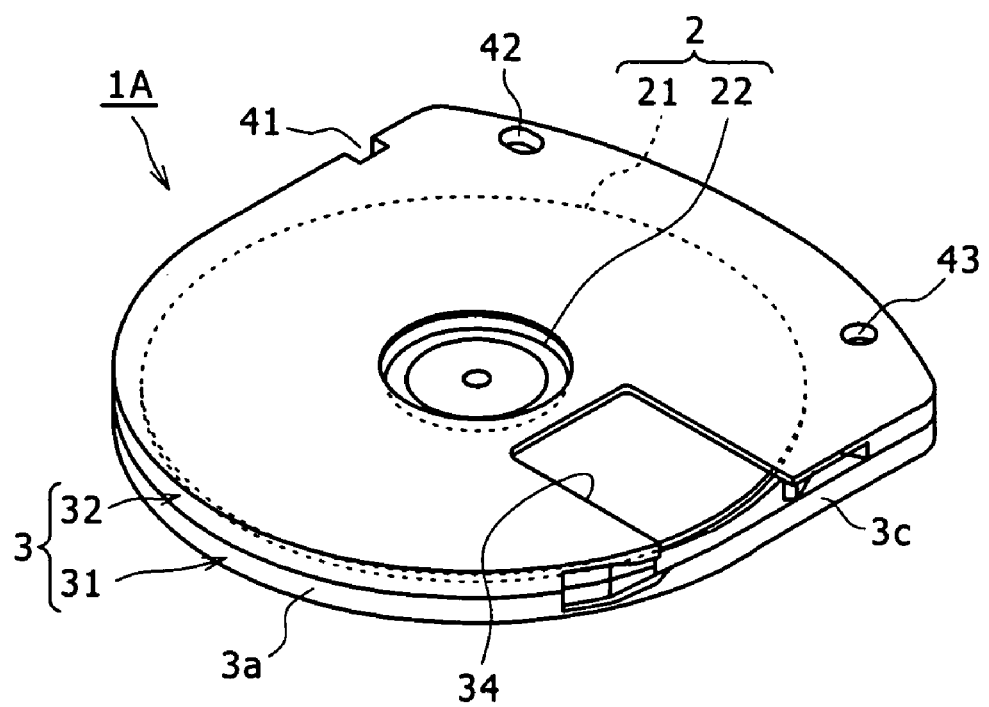
FIG. 17 is a perspective view of a disk cartridge which has no shutter.

Incidentally, FIG. 17 shows another embodiment of the disk cartridge. In this embodiment, the disk cartridge 1A has a so-called shutterless structure which is not provided with a shutter member 4. The other configurations are roughly the same as in the disk cartridge 1 having the shutter member 4, and, therefore, description thereof is omitted.

(3) Configuration of the Cartridge Holder

As shown in FIG. 3, the cartridge holder 102 includes a roughly square upper plate (top plate) 102a, left and right side plates (hereinafter referred to as first and second side plates) 102b, 102c formed by bending both left and right side portions of the upper plate 102a downwards roughly perpendicularly, a left-right pair of cartridge support portions 102d, 102e formed by bending the lower ends of the first and second side plates 102b, 102c roughly perpendicularly to the inside and being operative to support both left and right side portions of the lower surface of the disk cartridge 1 inserted, and receiving surface portions 102f, 102g formed by bending the front edges of the cartridge support portions 102d, 102e downwards. The upper plate 102a, the first and second side plates 102b, 102c, the left-right pair of cartridge support portions 102d, 102e and the like define an insertion port 102k for the disk cartridge 1 and a containing portion continuous with the insertion portion 102k. In addition, a bridge plate 102m is so mounted as to bridge the left-right pair of cartridge support portions 102d, 102e at a position near the insertion port 102k. The bridge plate 102m functions to reinforce the pair of cartridge support portions 102d, 102e against easy deformation and to prevent the disk cartridge 1 from flying out from between the pair of cartridge support portions 102d, 102e.

The upper plate 102a is provided in its central portion with a hexagonal opening portion 111 by blanking. The opening portion 111 is provided for reducing the weight of the cartridge holder 102.

A left-right pair of first and second leaf springs 112, 113 are provided at both left and right side portions of the opening portion 111. The first and second leaf springs 112, 113 are so bent as to enter into the containing portion 102k, and pushes the upper surface of the disk cartridge 1 inserted in the containing portion 102k to push the disk cartridge 1 against the cartridge support portions 102d, 102e. In addition, a left-right pair of third and fourth leaf springs 114, 115 are provided on the front end side of the opening portion 111. The third and fourth leaf springs 114, 115 are bent toward the upper side of the upper plate 102a, to make it possible to perform easily the insertion, mounting or the like of the cartridge holder 102 into, for example, a cartridge holder containing portion of an electronic apparatus. The first to fourth leaf springs 112 to 115 are formed by blanking parts of the upper plate 102a of the disk cartridge 1.

Figure 5:
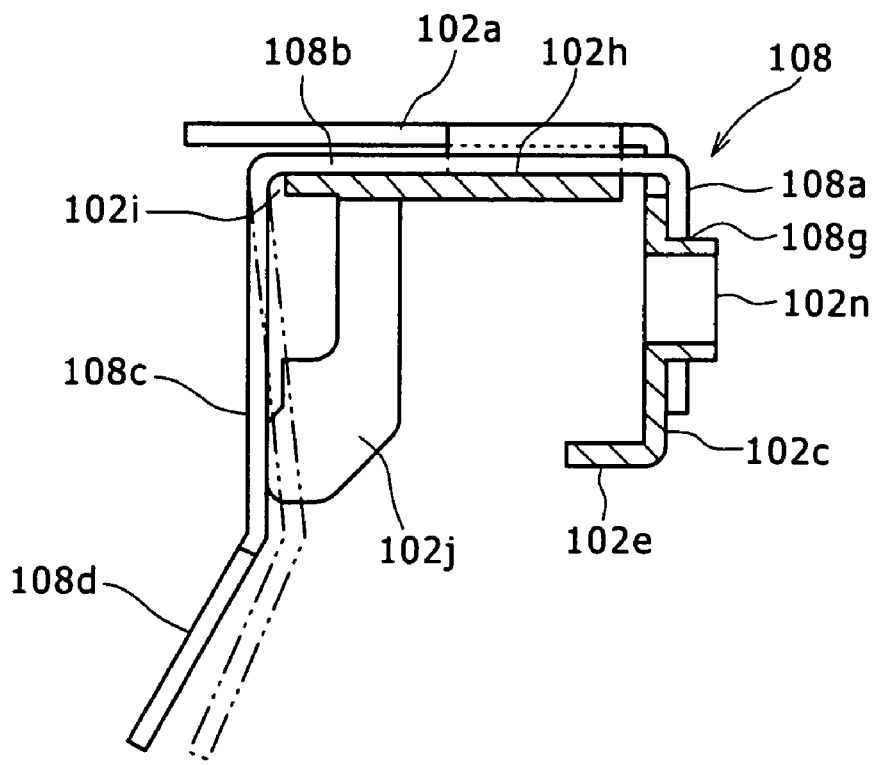
FIG. 5 is a sectional view showing the condition where the unlocking device is mounted.

A recessed form unlocking device mount portion 102h is formed in a space portion between the second leaf spring 113 and the second side plate 102c of the cartridge holder 102 and between the arcuate front surface 3a of the disk cartridge 1 inserted in the cartridge holder 102 and the second side plate 102c of the cartridge holder 102, which space portion is a so-called dead space. As shown in FIG. 5, two hollow cylindrical boss-like projections 102n are provided on the second side plate 102c of the cartridge holder 102 fronting on the unlocking device mount portion 102h. The unlocking device 108 is mounted to a roughly triangular dead space defined by the disk cartridge 1 inserted in the cartridge holder 102 and the arcuate front surface 3a and the side surface 3c of the cartridge body 3, by a method in which the boss-like projections 102n are inserted into projection fitting holes 108g provided in the mount portion 108a, a superposition portion 108b is superposed on the upper surface of the unlocking device mount portion 102h, the elastic piece portion 108c and an eject lever operating portion 108d are inserted into the cartridge holder 102, and tip end portions of the boss-like projections 102n are enlarged in diameter by caulking.

In addition, as shown in FIG. 3, the shutter unlocking member 116 is formed of a leaf spring material, and, like the mount portion 108a of the unlocking device 108, its one end portion side in the longitudinal direction is fastened to the second side plate 102c of he cartridge holder 102 by the boss-like projections 102n provided on the second side plate 102c of the cartridge holder 102. The shutter unlocking member 116 extends along the second side plate 102c of the cartridge holder 102 into the vicinity of the cartridge insertion port 102k, and its projected portion 117 enters into the cartridge holder 102 through a cutout window portion 118 provided in the second side plate 102c of the cartridge holder 102.

The shutter unlocking member 116 has the bent portion 116a as above-mentioned, is pressed against the second side plate 102c of the cartridge holder 102 by the bent portion 116a so as to receive a pre-pressure, and the projected portion 117 at the tip end thereof is inserted in the cutout window portion 118 provided in the second side plate 102c.

In the condition where the disk cartridge 1 is entirely contained in the cartridge holder 102, the projected portion 117 at the tip end of the shutter unlocking member 116 pushes an operated portion 57 of the shutter movement restriction member 5 to unlock the shutter member 4, as shown in FIG. 13.

The left-right pair of cartridge support portions 102d, 102e of the cartridge holder 102 are provided with a pair of positioning holes 119, and positioning pins 120 provided on the chassis 103 which will be described below are inserted in the pair of positioning holes 119.

In addition, the first and second side plates 102b, 102c of the cartridge holder 102 are provided, at their end portions on the opposite side of the cartridge insertion port, with bearing holes 121, 122 for turnably mounting the cartridge holder 102 to the chassis 103 which will be described next.

(4) Configuration of the Chassis

The chassis 103 is formed in a roughly tetragonal shape from a metal sheet. The chassis 103 is provided with damper mount portions 131 at the four corner portions thereof, and rubber-made dampers 132 are mounted to the damper mount portions 131. A pair of bearing portions 135, 136 for turnably mounting the cartridge holder 102 are provided on one end side of the left and right side portions of the chassis 103, and shafts 137 provided on the inside surfaces of the bearing portions 135, 136 are inserted in the bearing holes 121, 122 of the cartridge holder 102, whereby the cartridge holder 102 is supported to be turnable between the cartridge insertion/draw-out position and the recording/reproduction position.

As shown in FIG. 3, the chassis 103 is provided at its one side portion with a side wall 133 which, upon movement of the cartridge holder 102 to the recording/reproduction position, is located on the outside of the first side plate 102b of the cartridge holder 102 so as to prevent the cartridge holder 102 from swinging. On the outside of the second plate 102c of the cartridge holder 102, the shutter unlocking movement restriction portion 241 is formed in parallel to the side wall 133 so as to be paired with the side wall 133.

(5) Configuration of the Recording and/or Reproduction Device

As shown in FIG. 3, the recording and/or reproduction device 104 includes a spindle motor 151 for rotating the disc-shaped recording medium 2 of the disk cartridge 1, an optical pickup 152 for recording and/or reproduction of information on the disc-shaped recording medium 2, and a thread motor 153 for driving the optical pickup 152.

Figure 18:
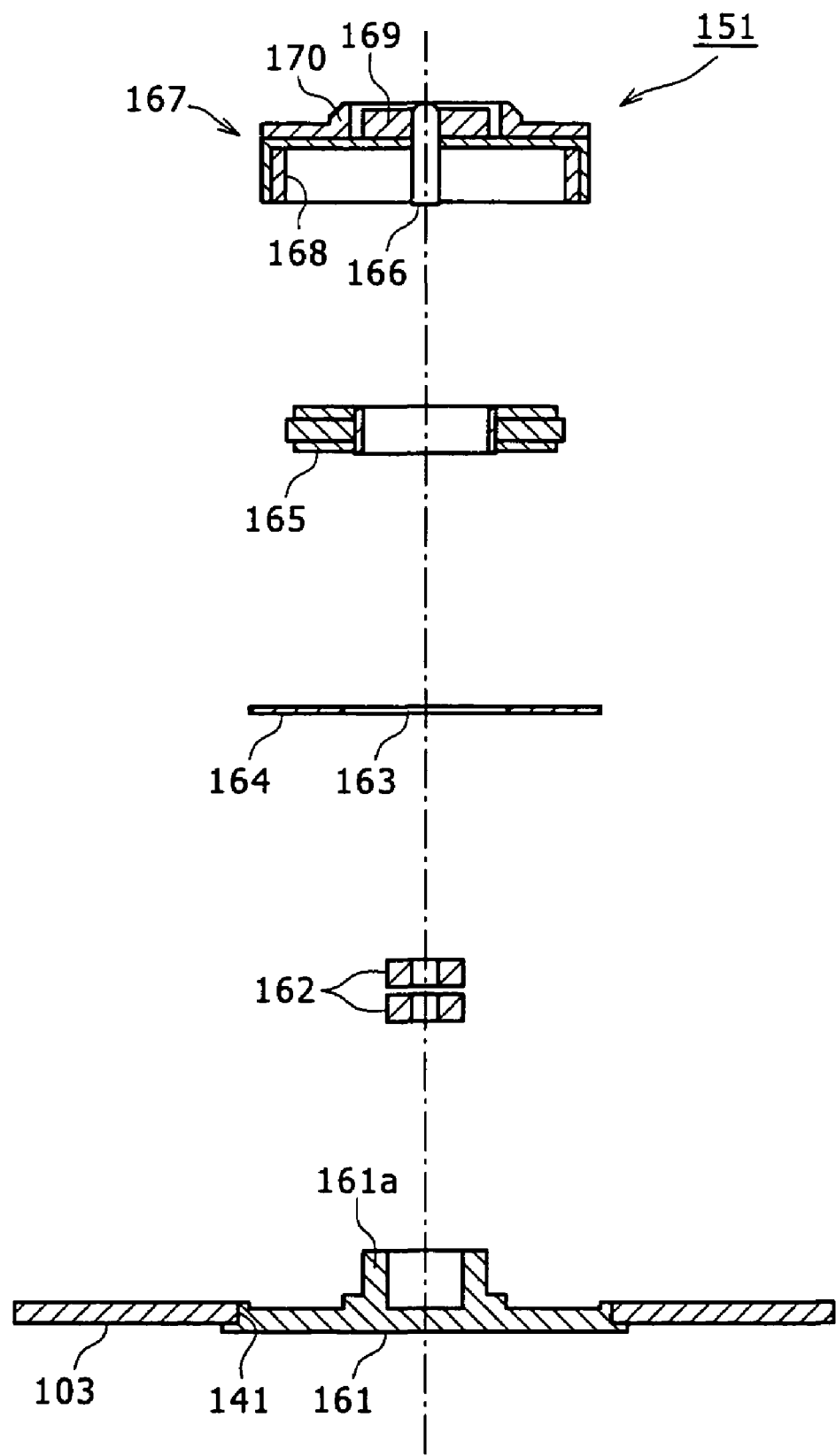
FIG. 18 is a sectional view showing a step of mounting a spindle motor.

As shown in FIG. 18, the spindle motor 151 includes a synthetic resin stator substrate 161 outsert molded on a spindle motor stator substrate forming hole (hereinafter referred to as the first stator substrate forming hole) 141 provided in the chassis 103, a tubular bearing portion 161a integrally molded on the upper surface of the stator substrate 161, bearings 162 attached to the inner periphery of the bearing portion 161a, a wiring plate 164 mounted on the stator substrate 161 with the tubular bearing portion 161a inserted in a central hole 163 thereof, an iron core coil 165 attached to the outer periphery portion of the tubular bearing portion 161a, and a rotor assembly 167 rotatably mounted with the tip end of a rotational center shaft 166 inserted in the bearings 162. A rotor magnet 168 paired with the iron core coil 165 is attached to the inner peripheral surface of the rotor assembly 167, and a disk table 170 for magnetically chucking the hub 22 of the disc-shaped recording medium 2 by a chucking magnet 169 is mounted to the upper surface of the rotor assembly 167.

As shown in FIG. 3, the optical pickup 152 includes an objective lens drive 171, and a carriage 172 for moving the objective lens drive 171 in the radial direction of the disc-shaped recording medium 2.

The carriage 172 includes a first bearing portion 173 and a second bearing portion 174. A lead screw 175 is attached to the first bearing portion 173. In addition, a guide portion 176 is attached to the second bearing portion 174.

The lead screw 174 is rotatably supported by a pair of bearings 177 on the lower side of the chassis 103. Besides, the guide portion 176 is formed integral with the chassis 103 by outsert molding.

A worm gear 181 is mounted to one end portion of the lead screw 175. As shown in FIG. 2, the worm gear 181 is meshed with a third gear 183 rotatably mounted to the lower surface of the chassis 103 through a shaft 182.

The third gear 183 is provided at its lower end portion with a second gear 184 which is greater in diameter than the third gear 183 and is coaxial with the third gear 183. The second gear 184 is rotatingly driven by the thread motor 153 through a first gear 185 which will be described below.

Figure 19:
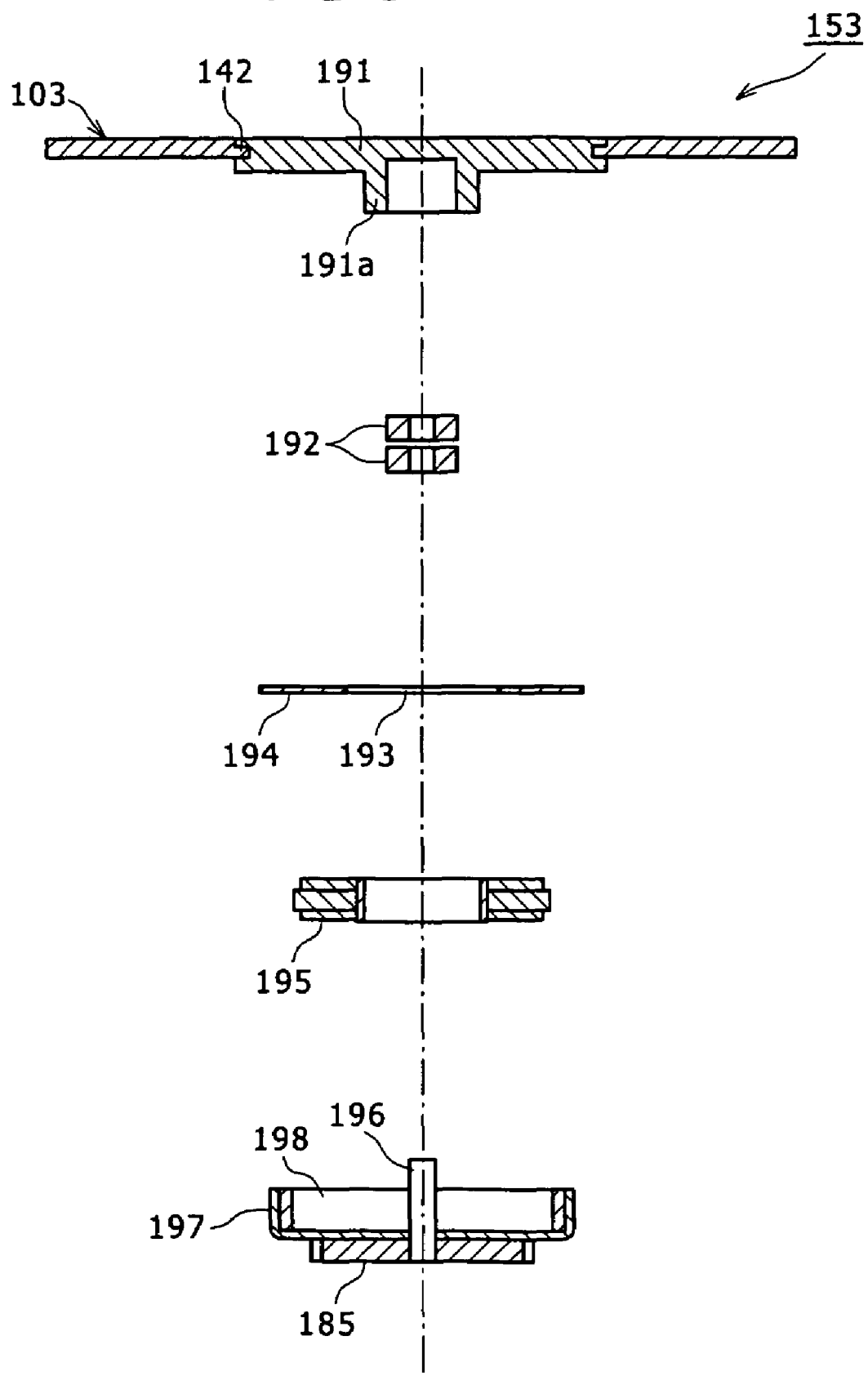
FIG. 19 is a sectional view showing a step of mounting a thread motor.

As shown in FIG. 19, the thread motor 153 includes a thread motor stator substrate forming hole (hereinafter referred to as the second stator substrate forming hole) 142 provided in the chassis 103, a tubular bearing portion 191a integrally molded on the upper surface of the stator substrate 191, bearings 192 attached to the inner periphery of the bearing portion 191a, a wiring plate 194 mounted on the stator substrate 191 with the tubular bearing portion 191a inserted in a central hole 193 thereof, an iron core coil 195 mounted to an outer peripheral portion of the tubular bearing portion 191a, and a rotor assembly 197 rotatably mounted with the tip end of a rotational center shaft 196 inserted in the bearing 192. A rotor magnet 198 paired with the iron core coil 195 is mounted to the inner peripheral surface of the rotor assembly 167, and the first gear 195 is mounted on the lower surface of the rotor assembly 167.

As shown in FIG. 2, when the lead screw 175 is rotated by the thread motor 153 through the first gear 185, the second gear 184, the third gear 183, and the worm gear 181, the carriage 172 is moved in the pickup arrangement hole 143 while being guided by the guide portion 176 to move the objective lens drive 171 in the radial direction of the disc-shaped recording medium 2.

(6) Configuration of the Eject Lever

The eject lever 105 is, at the time of insertion of the disk cartridge 1, pushed by the front surface 3a of the cartridge body 3 to turn against the biasing force of a biasing device 106 described below, and is locked to be incapable of returning turning by an eject lever locking device 107 described later. After recording and/or reproduction is finished, the locking of the eject lever 105 by the eject lever locking device 107 is canceled by the above-described unlocking device 108, whereby the eject lever 105 is put into returning turning by the biasing force of the biasing device 106, to discharge the disk cartridge 1 from the cartridge holder 102.

As shown in FIG. 3, the eject lever 105 includes a roughly V-shaped flat plate-like main portion 105a laid on the upper surface of the chassis 103, a pushed portion 105c provided on one end side of the flat plate-like main portion 105a with an arm portion 105b therebetween and pushed by the front surface 3a of the cartridge body 3, a bearing hole 105d provided on the other end side of the flat plate-like main portion 105a, and an operated portion 105e provided roughly symmetrical with the pushed portion 105c with the bearing hole 105d therebetween and unlockingly operated by an eject lever operation portion 108d of the unlocking device 108.

The eject lever 105 is mounted to the upper surface of the chassis 103 so as to be turnable by a shaft 105f, and a central portion of the front surface 3a of the cartridge body 3 of the disk cartridge 1 inserted into the cartridge holder 102 abuts on the pushed portion 105c. Besides, the eject lever 105 is mounted to the upper surface of the chassis 103 so that the flat plate-like main portion 105a can be lifted up by the shaft 105f to such a position as to be able to cancel the locking by the eject lever locking device 107.

Figure 8A:
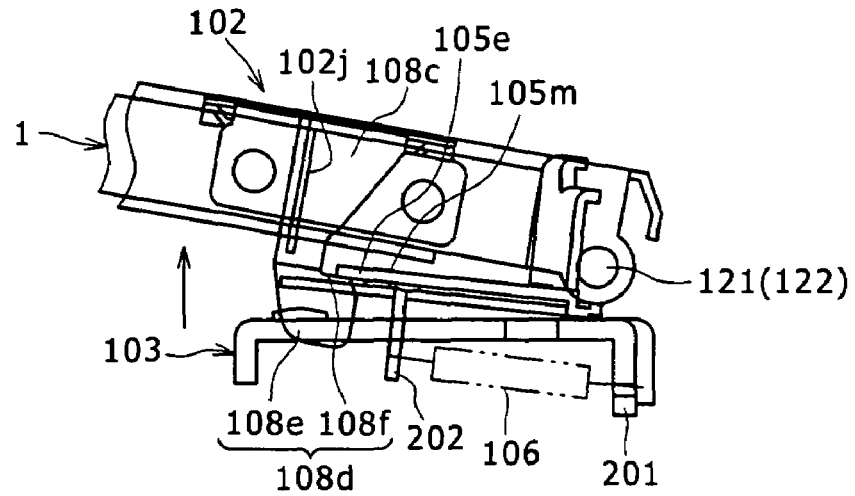
FIG. 8A is a side view showing the condition where the lower surface of the operated portion of the eject lever is lifted up by the engagement portion and the locking of the eject lever by the eject lever locking device is canceled.
Figure 8B:
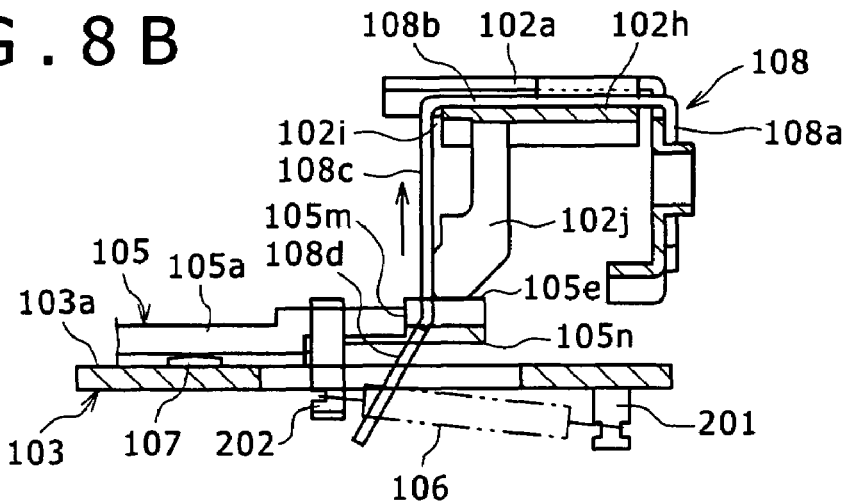
FIG. 8B is a plan view showing the same.
Figure 8C:
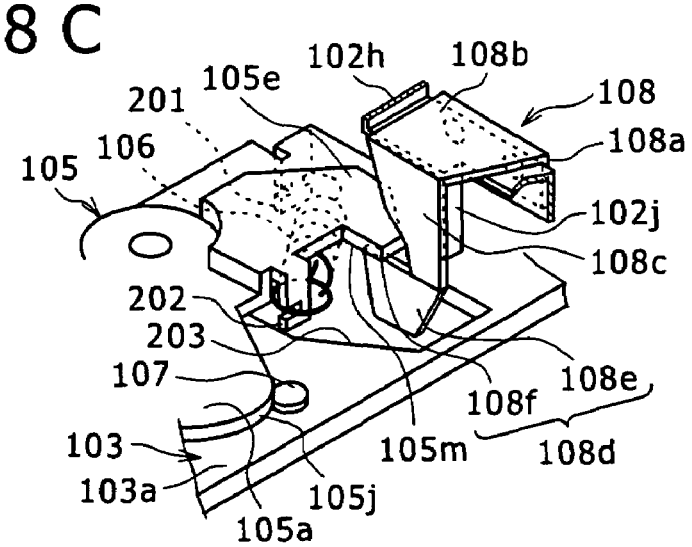
FIG. 8C is a perspective view showing the same.
Figure 20:
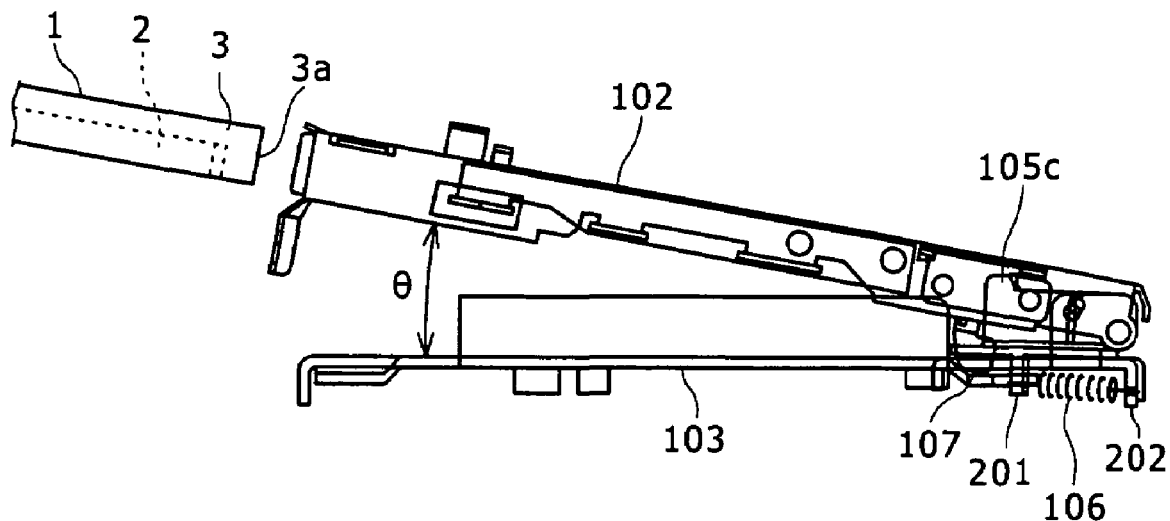
FIG. 20 is a side view showing the condition where the cartridge holder is set in a cartridge insertion/draw-out position.
Figure 21:
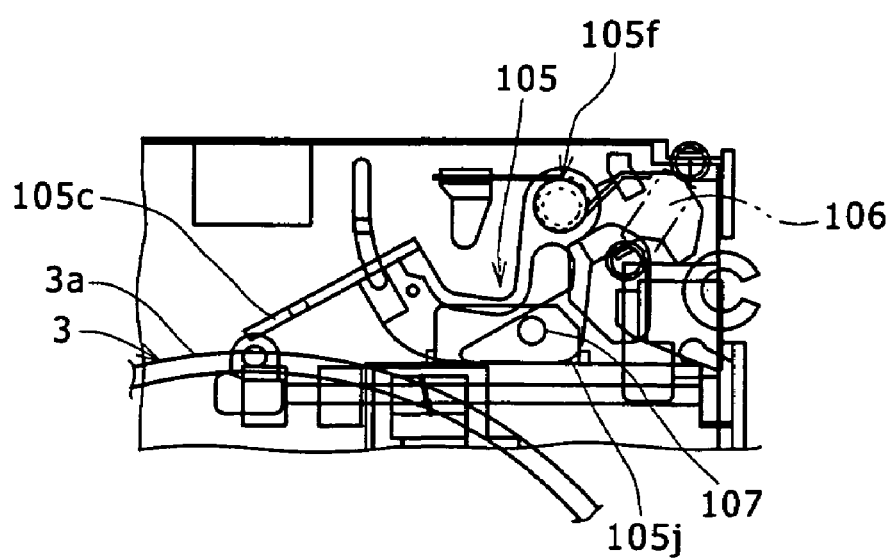
FIG. 21 is a plan view showing the condition before the eject lever is pushed.
Figure 22:
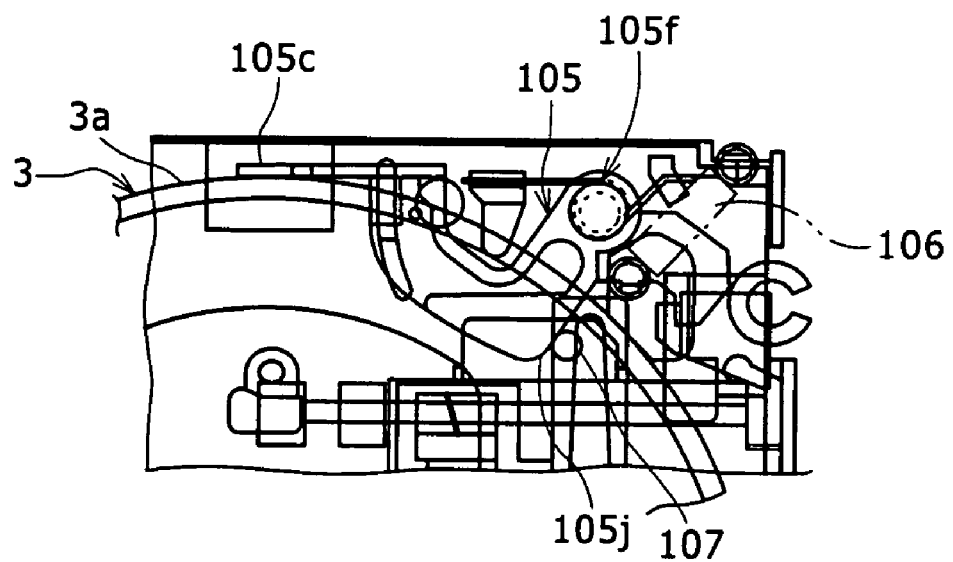
FIG. 22 is a plan view showing the condition after the eject lever is pushed.

The eject lever 105 is configured as above described. When the disk cartridge 1 is inserted in the cartridge holder 102 at the cartridge insertion/draw-out position (the condition where the cartridge holder 102 is inclined at a predetermined inclination angle θ against the chassis 103) as shown in FIG. 20, the pushed portion 105c is pushed by the front surface 3a of the cartridge body 3 to turn against the biasing force of the biasing device 106 (described below) as shown in FIG. 21, and, when the disk cartridge 1 is entirely contained in the cartridge holder 102, the eject lever locking device 107 (described below) is engaged with the outside surface 105*j* of the pushed portion 105*e* as shown in FIG. 22, whereby the eject lever 105 is locked to be incapable of returning turning, so that the cartridge holder 102 is maintained in the state of being incapable of returning turning even where the cartridge holder 102 is turned to the recording/reproduction position. When the cartridge holder 102 is turned from the recording/reproduction position to the cartridge insertion/draw-out position after the recording and/or reproduction is finished, the unlocking device 108 cancels the locking of the eject lever 105 by the eject lever locking device 107, as shown in FIG. 8. Therefore, the eject lever 105 is put into returning turning by the biasing force of the biasing device 106, to discharge the disk cartridge 1 from the cartridge holder 102.

(7) Configurations of the Biasing Device and the Eject Lever Locking Device

The biasing device 106 exerts on the eject lever 105 a turning force in the disk cartridge discharging direction, and also exerts a biasing force for pulling the eject lever 105 toward the chassis 103.

Figure 6A:
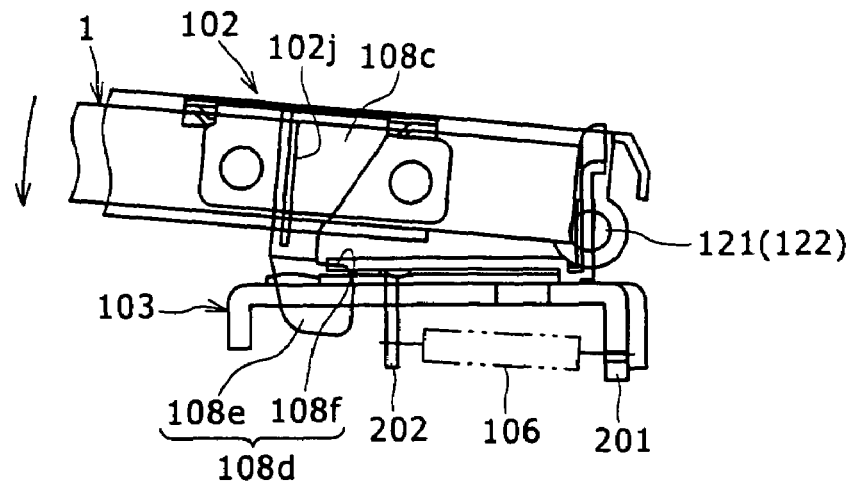
FIG. 6A is a side view showing the condition where a side surface of an operated portion of an eject lever is in contact with an inclined surface portion of the unlocking device, FIG.
Figure 6B:
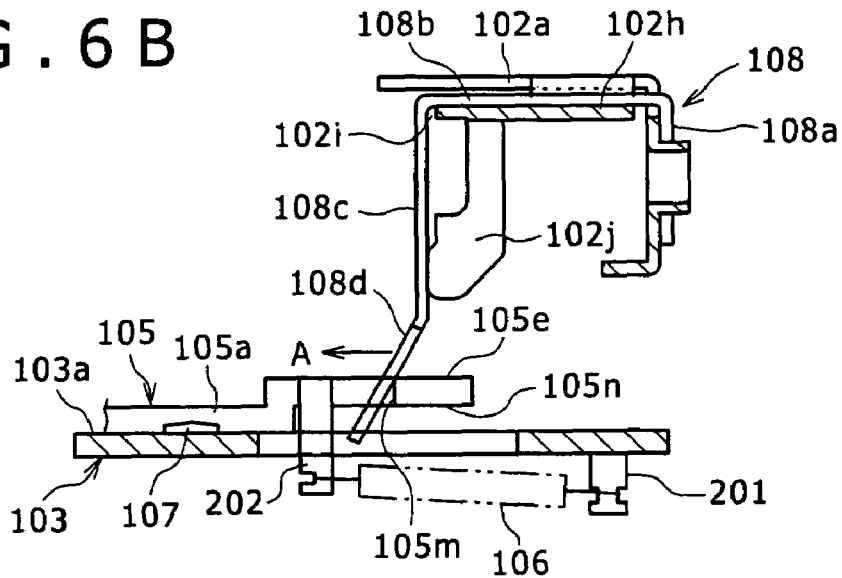
FIG. 6C is a perspective view showing the same.
Figure 6C:
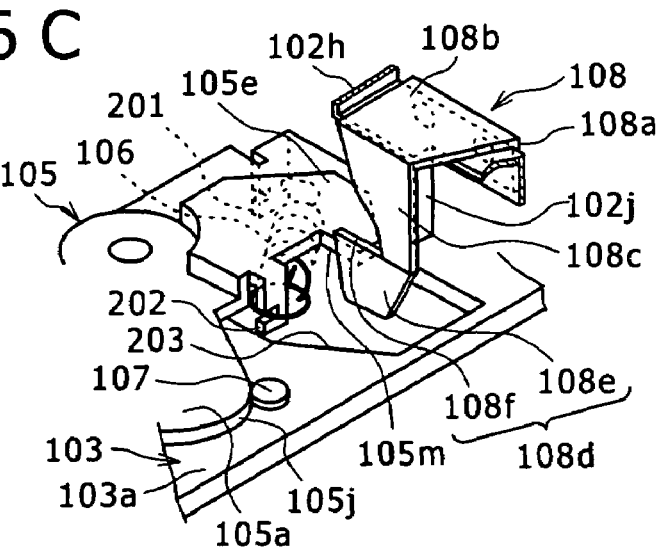
Figure 7A:
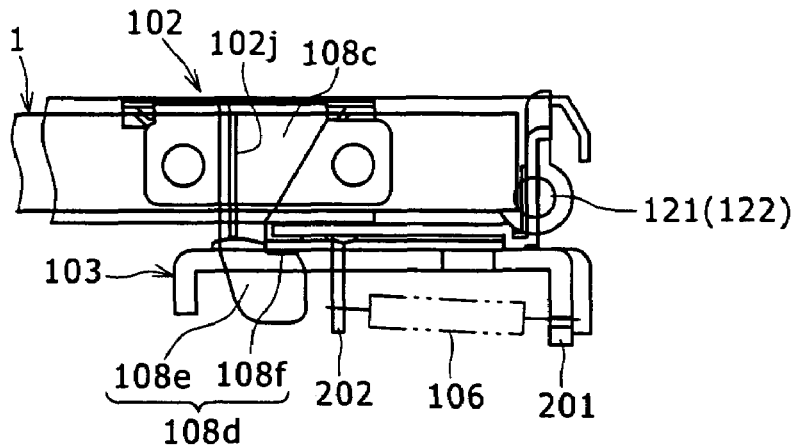
FIG. 7A is a side view showing the condition where an elastic piece portion has been elastically returned and an engagement portion is in engagement with the lower surface of the operated portion of the eject lever.
Figure 7B:
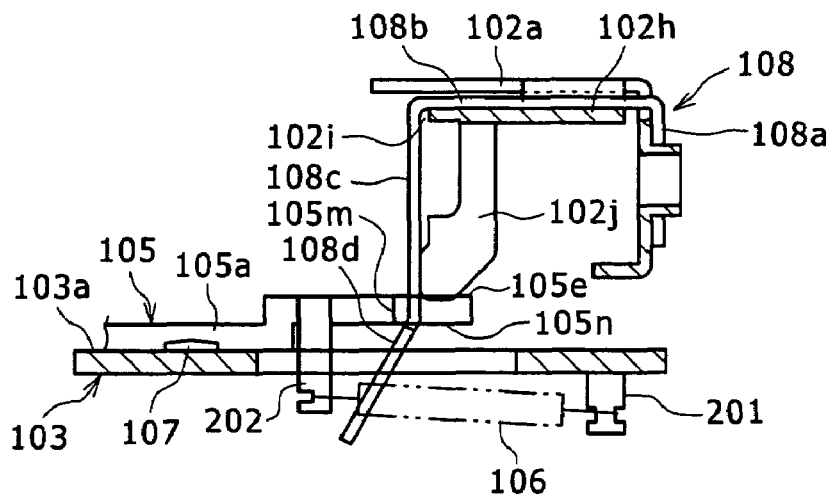
FIG. 7B is a plan view showing the same.
Figure 7C:
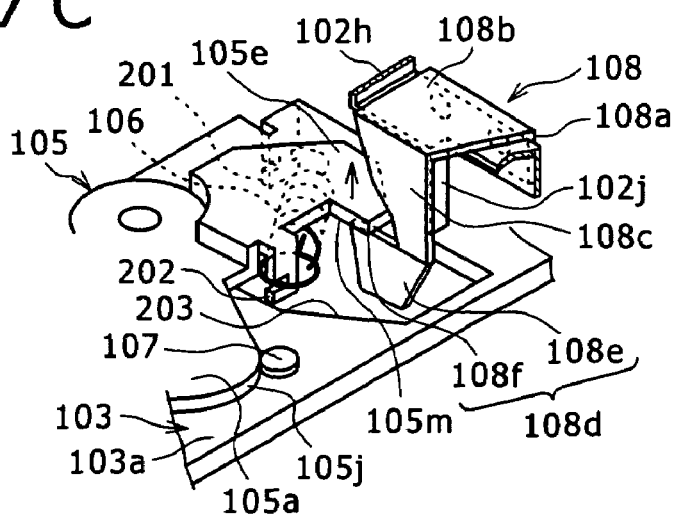
FIG. 7C is a perspective view showing the same.

As shown in FIGS. 6 to 8, the biasing device 106 is composed by use of a coil spring, and is disposed on the lower side of the chassis 103. One end side of the biasing device 106 is locked to a first spring locking portion 201 provided on the chassis 103, and the other end side is locked to a second spring locking portion 202 provided on the eject lever 105. The second spring locking portion 202 protrudes to the lower side of the chassis 103 through a cutout hole portion 203 provided in the chassis 103.

The eject lever locking device 107 is, when the eject lever 105 is turned against the biasing device 106 to a position where the disk cartridge 1 is entirely contained in the cartridge holder 102, engaged with the outside surface 105*j* of the flat plate-like main portion 105*a* of the eject lever 105 to thereby lock the eject lever 105 in the state of being incapable of returning turning.

The eject lever locking device 107 is formed by providing a boss-like projected portion on the upper surface of the chassis 103. The eject lever locking device 107 is configured to be disengaged from the outside surface 105*j* when the flat plate-like main portion 105*a* of the eject lever 105 is lifted up from the chassis 103 against the biasing force of the biasing device 106. The eject lever 105 disengaged from the eject lever locking device 107 is turned, with the flat plate-like main portion 105*a* riding on the eject lever locking device 107, to thereby discharge the disk cartridge 1 from the cartridge holder 102. The unlocking device 108 functions to lift up the outside surface 105*j* of the flat plate-like main portion 105*a* of the eject lever 105 from the chassis 103 against the biasing force of the biasing device 106.

(8) Configuration of the Unlocking Device

The unlocking device 108 is formed separately from the cartridge holder 102 by use of a leaf spring material, and is mounted to the cartridge holder 102.

Figure 4:
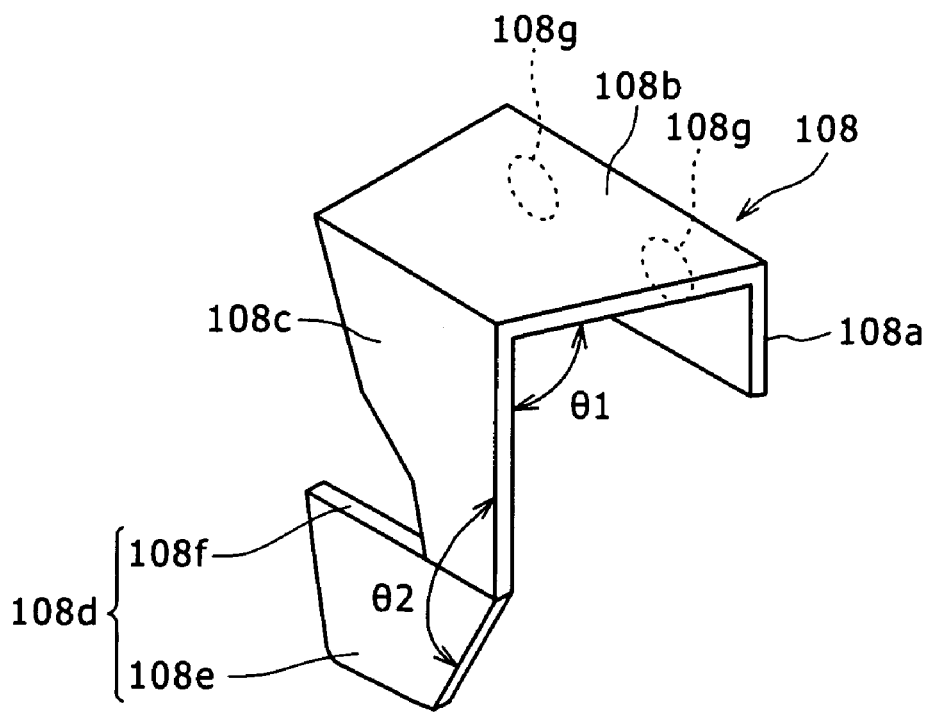
FIG. 4 is a perspective view of an unlocking device.

As shown in FIGS. 1, 4 and 5, the unlocking device 108 includes a mount portion (attachment portion) 108*a* fixedly mounted (attached) to a side surface of the cartridge holder 102, a superposition portion 108*b* continuous with the mount portion 108*a* in the state of being bent roughly perpendicularly relative to the mount portion 108*a* and superposed on the upper surface of an unlocking device mount portion 102*h* formed by recessing the upper surface 102*a* of the cartridge holder 102, an elastic piece portion 108*c* which is continuous with the superposition portion 108*b* in the state of being bent at an acute angle θ1 (about 80°) relative to the superposition portion 108*b*, enters into the cartridge holder 102 through a cutout window portion 102*i* provided in the upper surface 102*a* of the cartridge holder 102 and extends to the side of the chassis 103, and an eject lever operation portion 108*d* continuous with the elastic piece portion 108*c* in the state of being bent at an obtuse angle θ2 (about 160°) relative to the elastic piece portion 108*c*.

The eject lever operation portion 108*d* includes an inclined surface portion 108*e* pushed by a side surface 105*m* of the operated portion 105*e* of the above-described eject lever 105 to flex the elastic piece portion 108*c*, and an engagement portion 108*f* engaged with the lower surface 105*n* of the operated portion 105*e* when the pushing of the inclined surface portion 108*e* by the side surface 105*m* of the operated portion 105*e* is canceled and the elastic piece portion 108*c* is returningly moved.

As shown in FIG. 5, the elastic piece portion 186*c* is pressed against an elastic piece positioning portion 102*j* provided on the lower surface of the unlocking device mount portion 102*h* to be thereby bent roughly perpendicularly and to be given a so-called pre-pressure, and is positioned in a predetermined position. The unlocking device 108 is formed by bending a spring plate material blanked into a predetermined shape.

As shown in FIG. 6, the eject lever operation portion 108*d* is, in the process of moving the cartridge holder 102 from the cartridge insertion/draw-out position to the recording/reproduction position, moved in an escaping direction (the direction of arrow A), with its inclined surface portion 108*e* pushed by the side surface 105*m* of the operated portion 105*e* of the eject lever 105. When the cartridge holder 102 is moved to the cartridge recording/reproduction position, the pushing of the inclined surface portion 108*e* by the side surface 105*m* of the operated portion 105*e* is canceled, whereby the elastic piece portion 108*c* is returningly moved, i.e., elastically returned, and the engagement portion 108*f* is engaged with the lower surface 105*n* of the operated portion 105*e*, as shown in FIG. 7.

At the time of moving the cartridge holder 102 from the cartridge insertion/draw-out position to the recording/reproduction position after the recording and/or reproduction is finished, the eject lever 105 is lifted up through the lower surface 105*n* of the operated portion 105*e* of the eject lever 105 to be lifted up from the upper surface of the chassis 103, as shown in FIG. 8, so that the locking of the eject lever 105 by the eject lever locking device 107 is canceled, and the eject lever 105 is turned by the biasing force of the biasing device 106 to push out the disk cartridge 1 from the cartridge holder 102.

The unlocking device 108 is disposed in a free space as a roughly triangular dead space defined by the arcuate front surface 3*a* of the cartridge body 3 of the disk cartridge 1 inserted in the cartridge holder 102 and one side surface and the front surface of the cartridge holder 102. In addition, the cartridge holder 102 is turnably mounted to the chassis 103, and cancels the locking of the eject lever 105 by the eject lever locking device 107 at the time of turning movement of the cartridge holder 102 from the cartridge insertion/draw-out position to the recording/reproduction position.

(9) Other Embodiments and Other Configurations

FIG. 33 shows another embodiment. In this embodiment, an extension portion 116*b* extending to the side of the chassis 103 is provided between the bent portion 116*a* and the projected portion 117 of the shutter unlocking member 116. By the extension portion 116*b*, it is possible to retard the timing of the unlocking of the shutter unlocking member 116 by the shutter unlocking member movement restriction portion 241. The shutter unlocking member movement restriction portion 241 may be provided with an extension portion extending to the side of the shutter unlocking member 116, in place of the bent portion 116a provided in the shutter unlocking member 116.

Figure 34A:
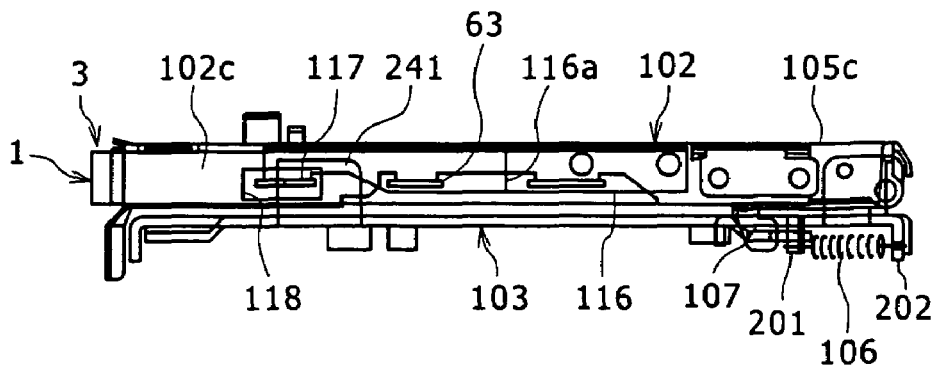
FIG. 34A is a side view of a shutter unlocking member movement restriction portion in a further embodiment.
Figure 34B:
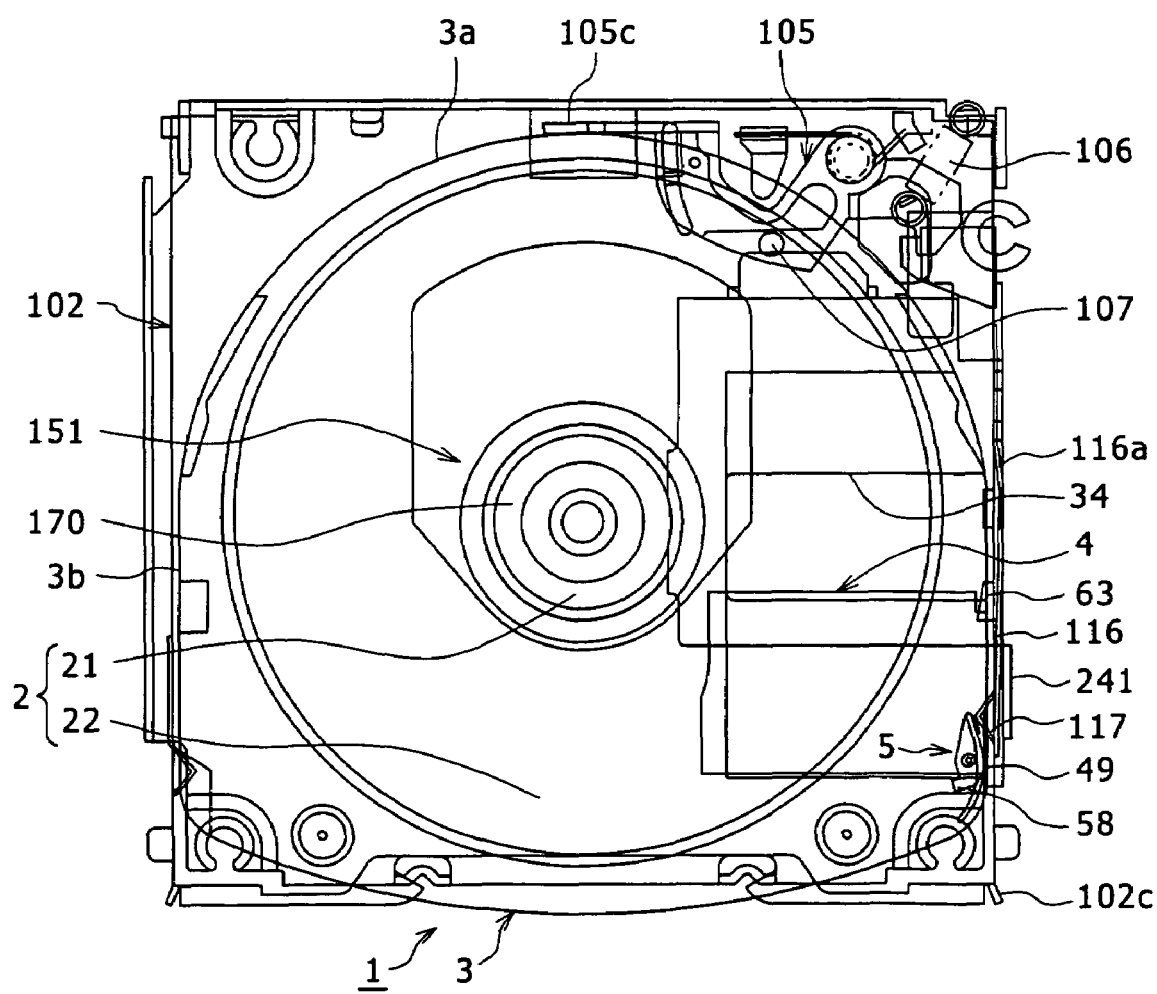
FIG. 34B is a plan view of the same.
Figure 35:
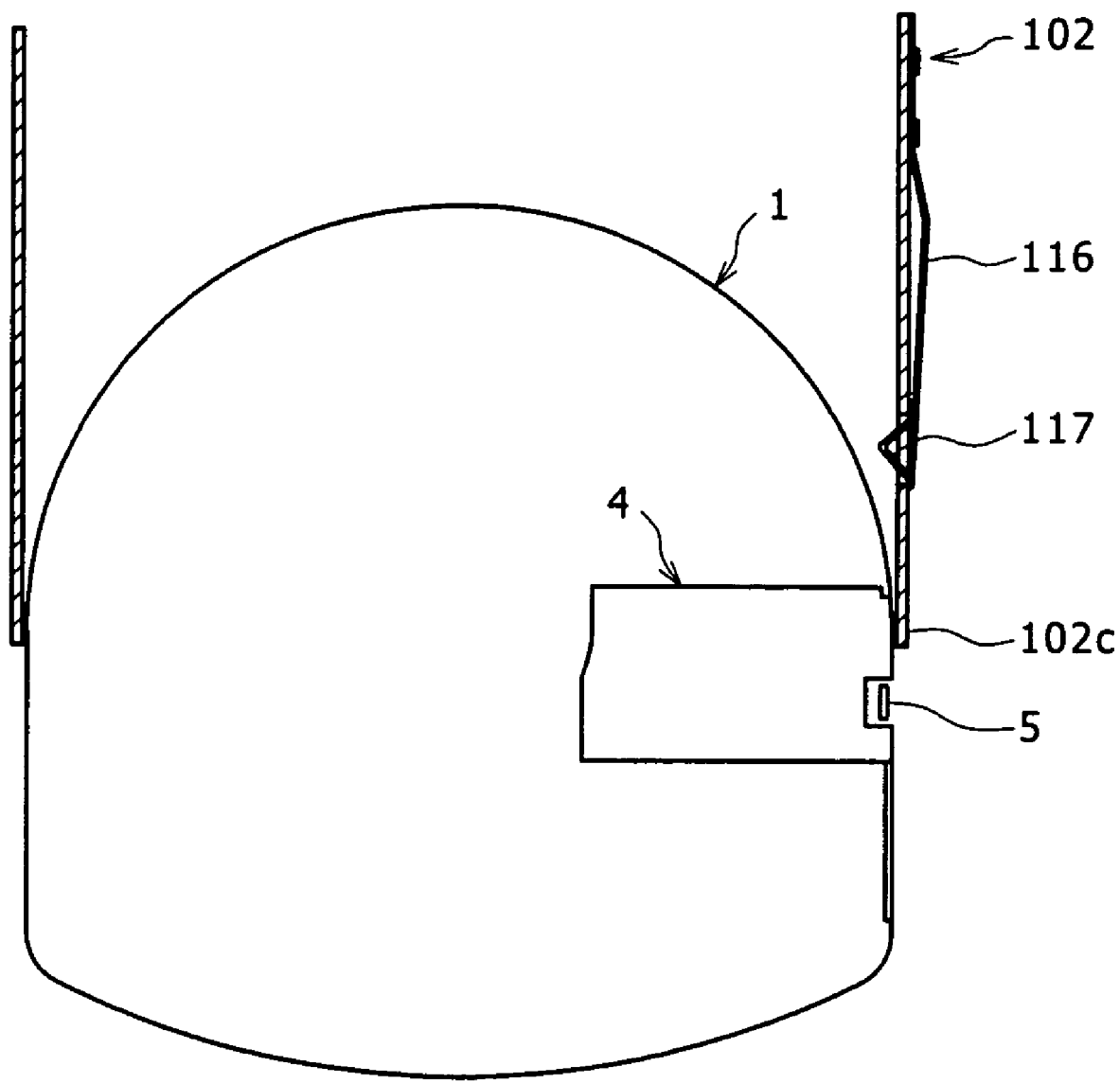
FIG. 35 is a plan view of an example of the related art.
Figure 36:
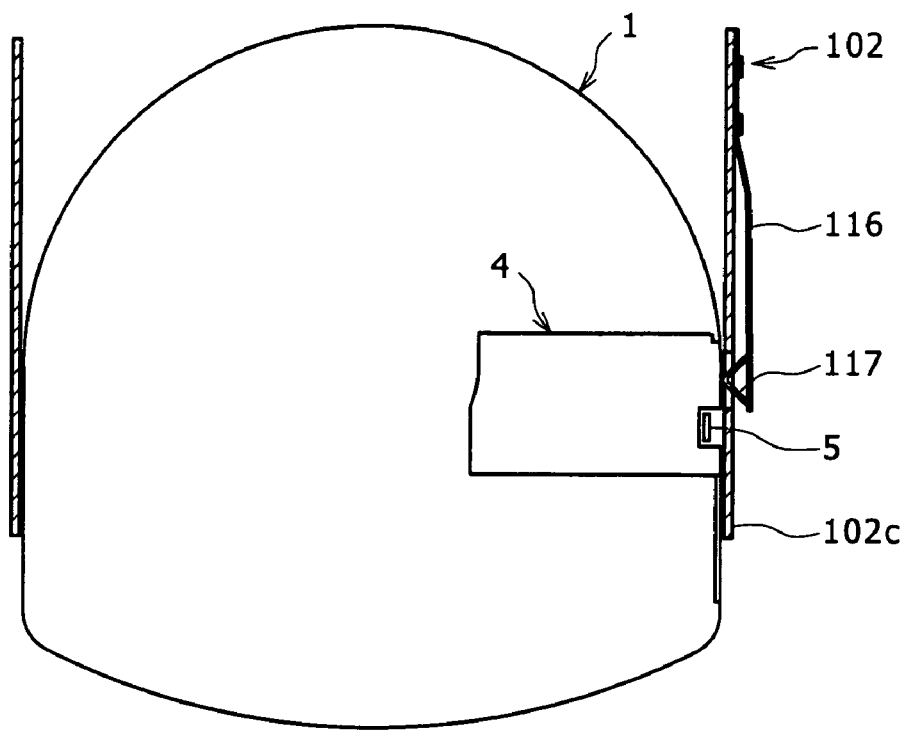
FIG. 36 is a plan view of an example of the related art.
Figure 37:
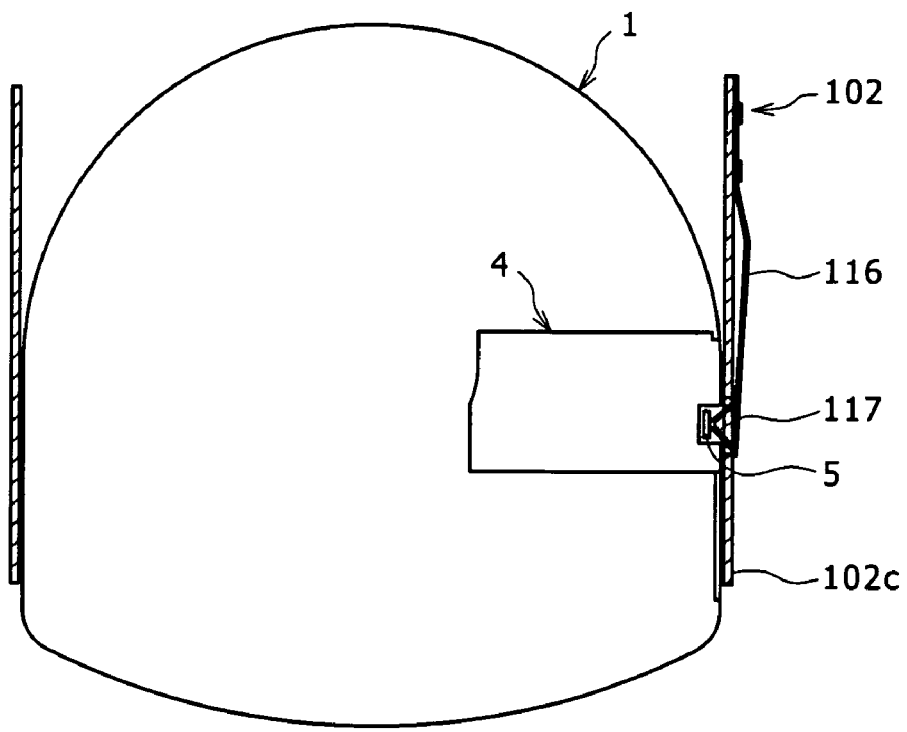
FIG. 37 is a plan view of an example of the related art.

FIG. 34 shows a further embodiment. In this embodiment, the shutter unlocking member movement restriction portion 241 is provided at a position opposite to the projected portion 117 of the shutter unlocking member 116, whereby the escaping movement of the shutter unlocking member 116 can be securely prevented. Besides, while the case of turning the eject lever 105 has been shown in the above embodiment, the eject lever 105 may be moved rectilinearly.

Figure 23:
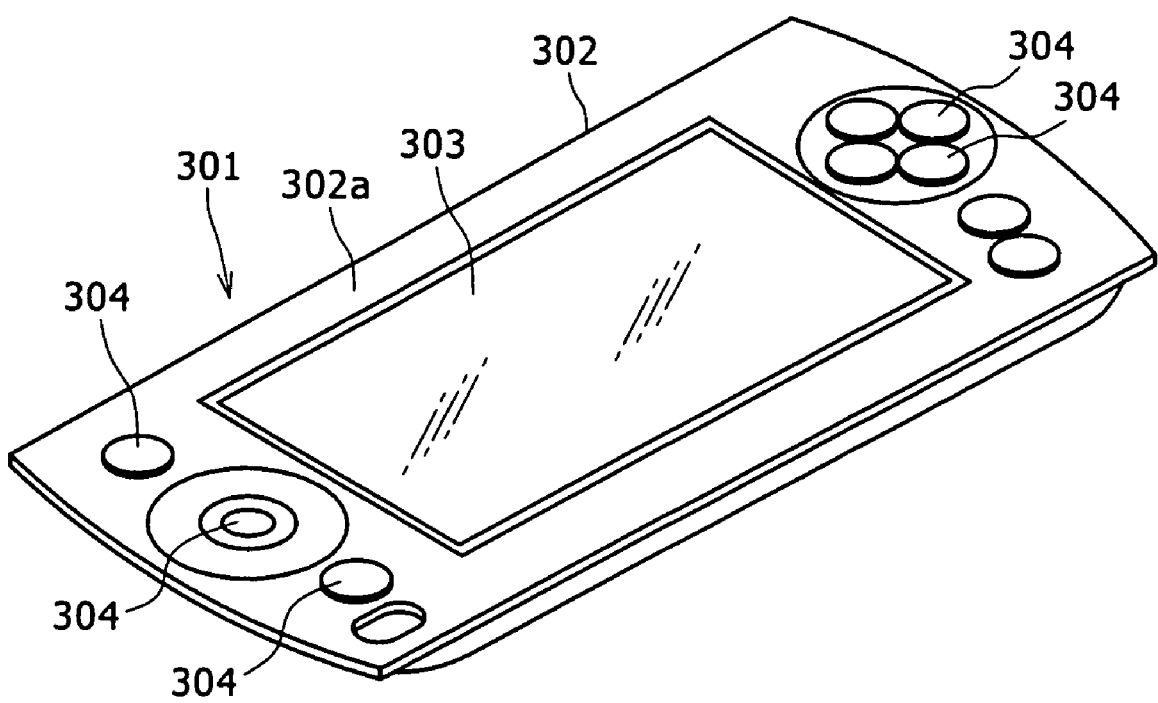
FIG. 23 is a perspective view of an electronic apparatus.
Figure 24:
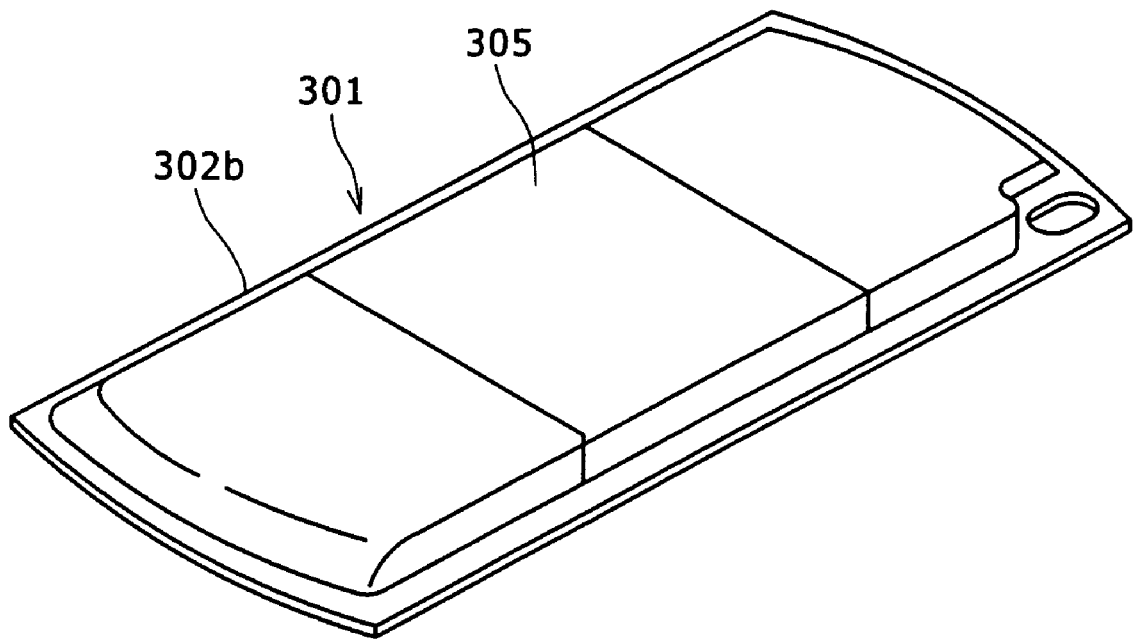
FIG. 24 is a perspective view of the electronic apparatus as viewed from the back side.
Figure 25:
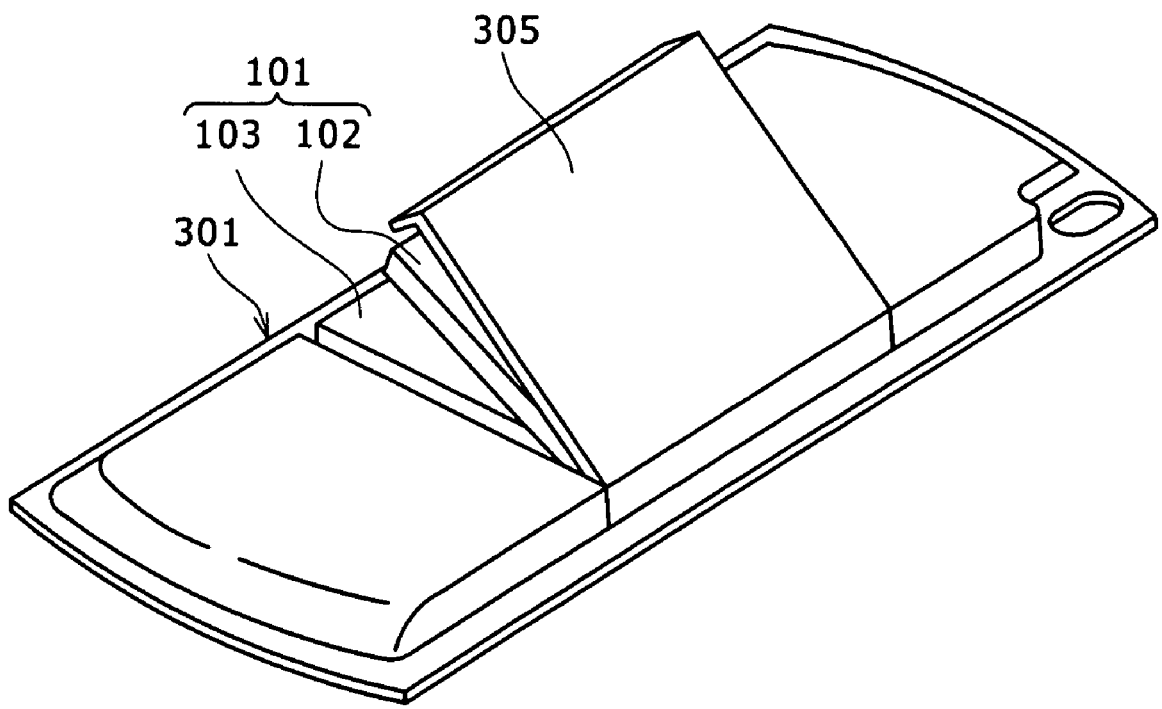
FIG. 25 is a perspective view of the condition where a lid portion is opened.

FIGS. 23 to 25 show an electronic apparatus 301, such as a game machine, on which the recording and/or reproduction apparatus 101 according to an embodiment of the present invention is mounted. The electronic apparatus 301 is formed in a flat horizontally elongate shape; as shown in FIG. 23, a display portion 303 such as a liquid crystal display is disposed at a central portion on the side of the front surface 302a of a casing 302 of the electronic apparatus 301, and a plurality of control keys 304 are disposed on both side portions. Besides, as shown in FIG. 24, a lid portion 305 capable of turning for opening and closing is provided at a central portion on the back side 302a of the casing 302 of the electronic apparatus 301. In addition, as shown in FIG. 25, a cartridge holder 102 of the disk recording and/or reproduction apparatus 101 is mounted to the lid portion 305, and a chassis 103 of the disk recording and/or reproduction apparatus 101 is mounted to the side of the casing 302 so that when the lid portion 305 is opened, the cartridge holder 102 is also turned to be moved to the cartridge insertion/draw-out position.

(10) Functions

Now, the functions of the disk recording and/or reproduction apparatus 101 will be described below.

Figure 26A:
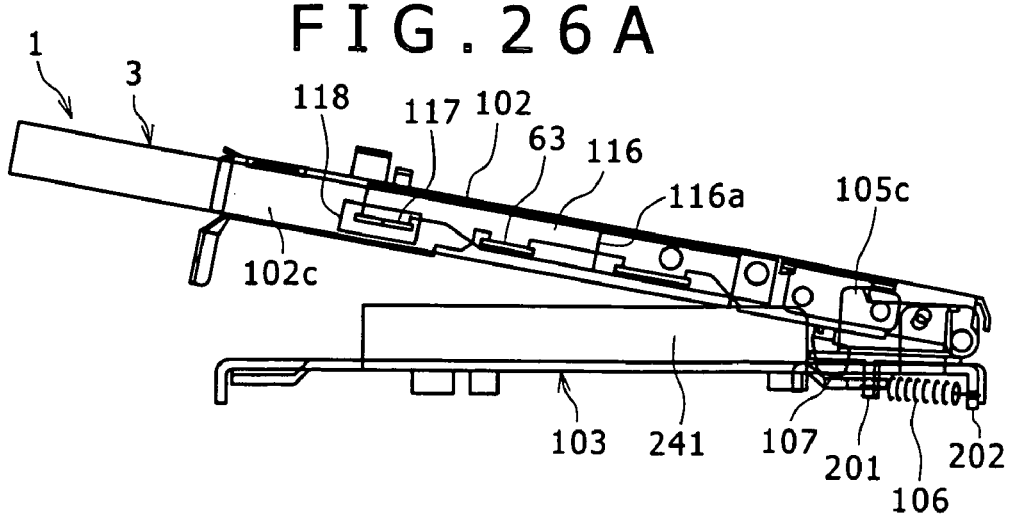
FIG. 26A is a side view showing a function of a shutter unlocking member.
Figure 26B:
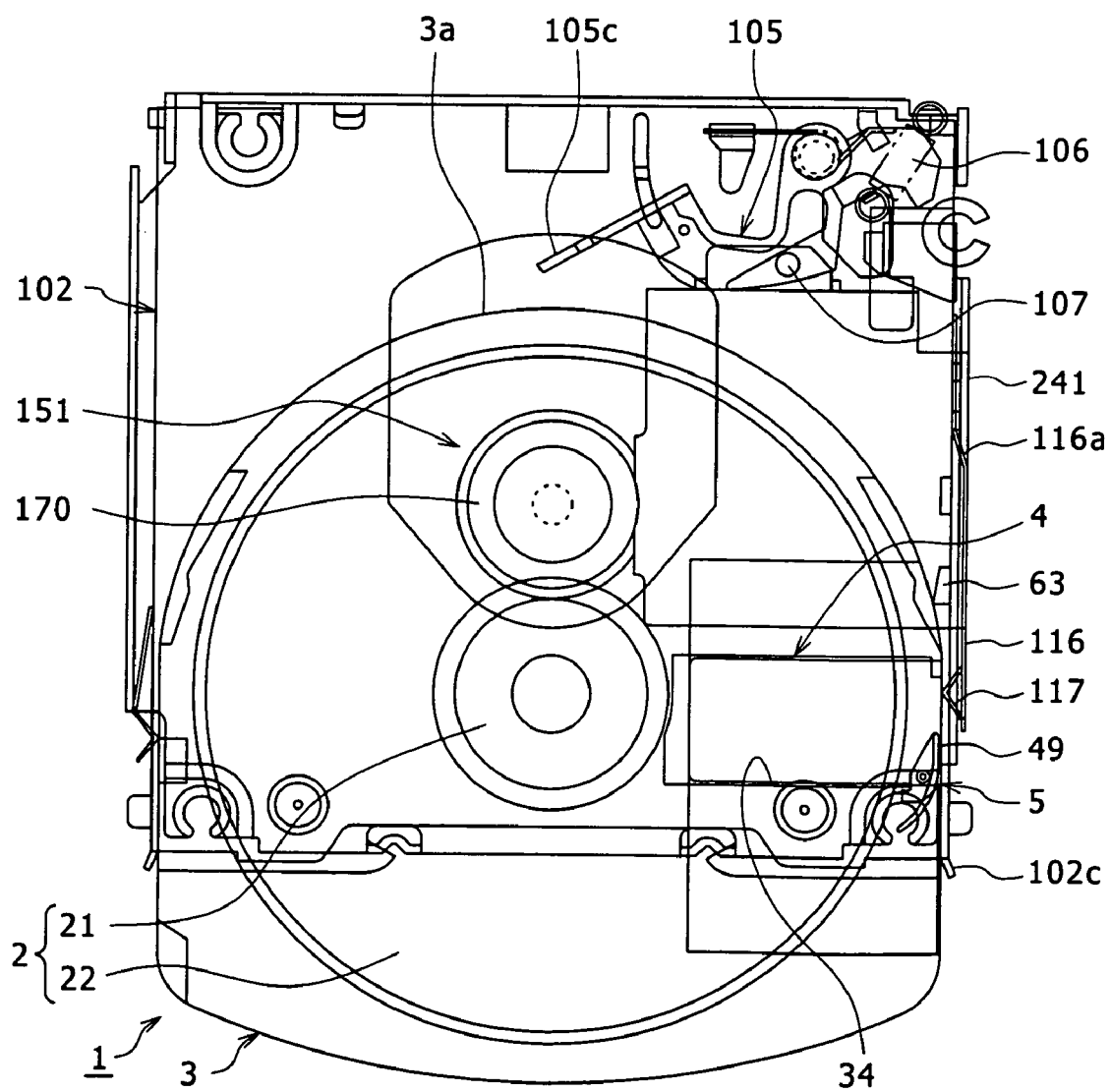
FIG. 26B is a plan view showing the same.

When the lid portion 305 of the electronic apparatus 301 is opened, the cartridge holder 102 is also turned following up to the lid portion 305, to be moved to the cartridge insertion/draw-out position. In the cartridge insertion/draw-out position, the disk cartridge 1 is inserted into the cartridge holder 102, as shown in FIGS. 26A and 26B. In this instance, the projected portion 117 at the tip end of the shutter unlocking member 116 makes sliding contact with the outside surface of the first movement guide piece 49 of the shutter member 4, and a side pressure is exerted on the second side surface 3c of the cartridge body 3 of the disk cartridge 1.

When the disk cartridge 1 is inserted into the cartridge holder 102 by a predetermined amount, the projected portion 117 of the shutter unlocking member 116 is fitted into the pushing operation opening portion 48 provided in the first guide piece 49, to push the pushed portion 57 of the shutter movement restriction member 5 of the disk cartridge 1, thereby unlocking the shutter member 4, and the shutter movement inhibitive projected portion 63 provided on the inside surface of the second side plate 102c of the cartridge holder 102 abuts on one end portion of the shutter member 4 to inhibit the movement of the shutter member 4, as shown in FIGS. 27A and 27B.

Figure 28A:
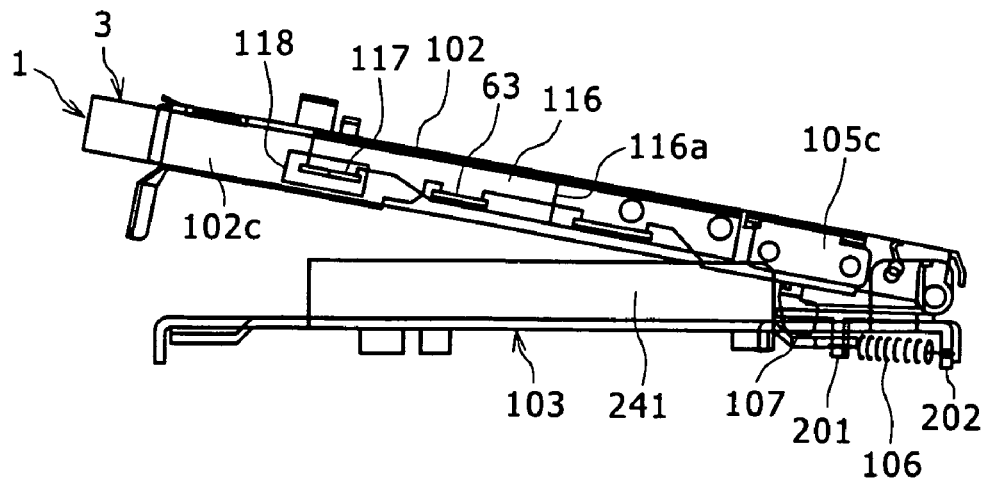
FIG. 28A is a side view showing a function of the shutter unlocking member.
Figure 28B:
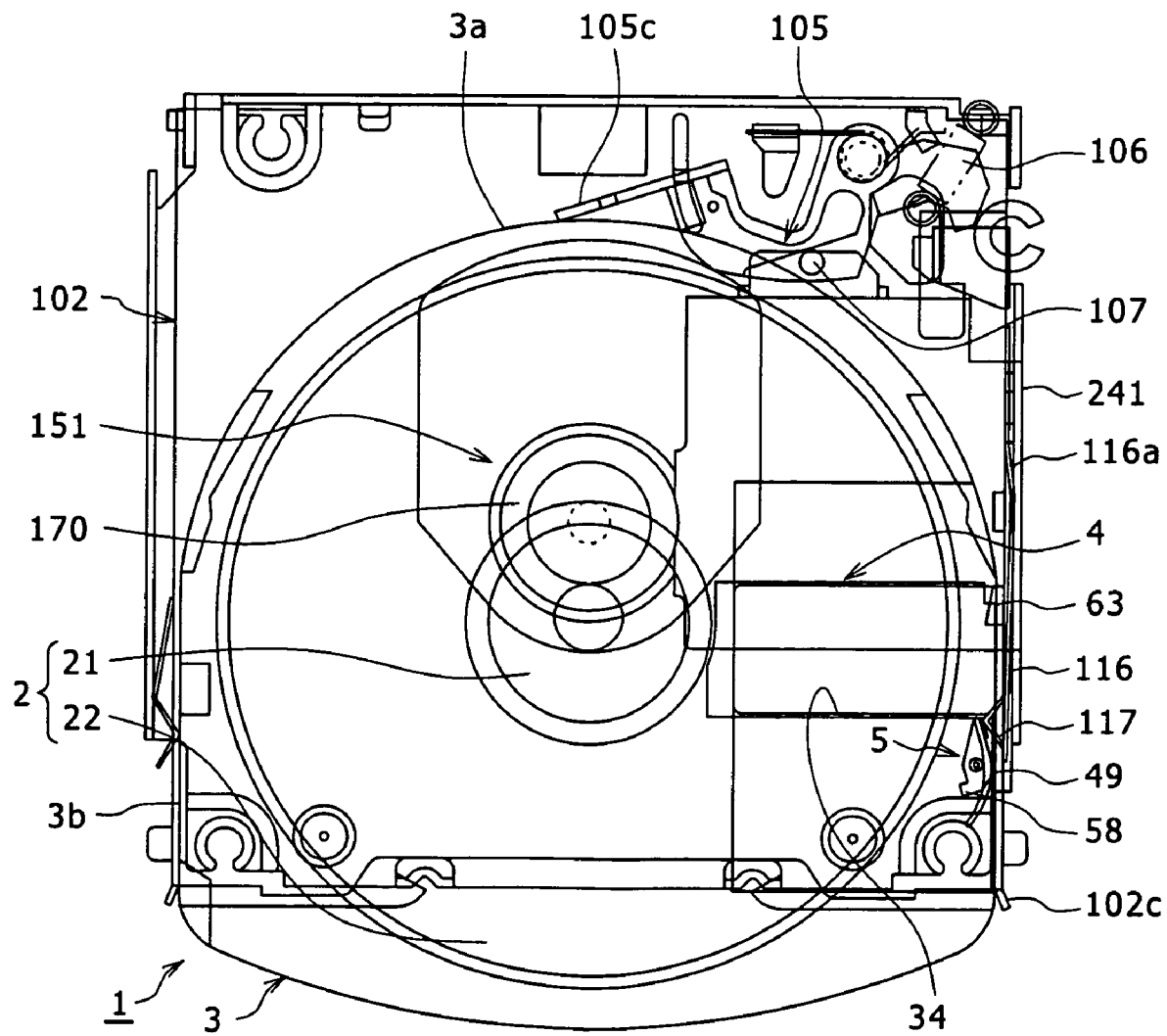
FIG. 28B is a plan view showing the same.

When the disk cartridge 1 is inserted further, only the cartridge body 3 is inserted into the cartridge holder 102 while the shutter member 4 is stopped, whereby the recording and/or reproduction opening portion 34 of the disk cartridge 1 is gradually opened, the eject lever 105 is pushed and turned, and a biasing force is gradually accumulated in the biasing device 106, as shown in FIGS. 28A and 28B.

Figure 29A:
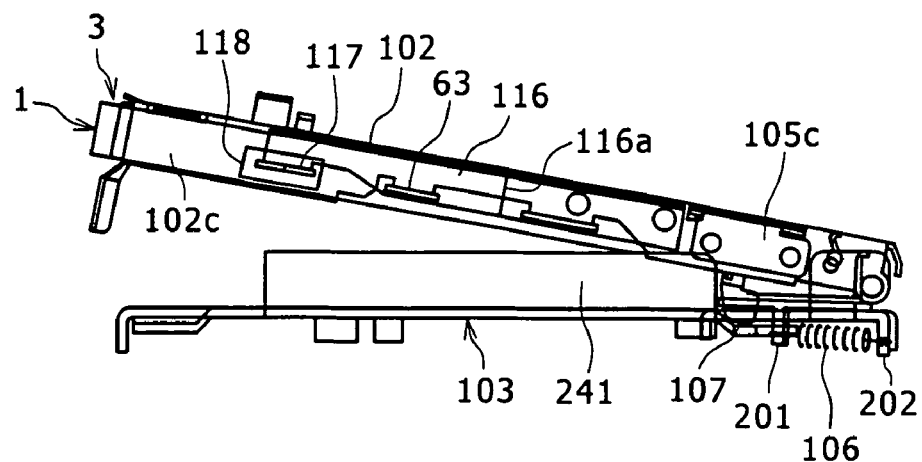
FIG. 29A is a side view showing a function of the shutter unlocking member.
Figure 29B:
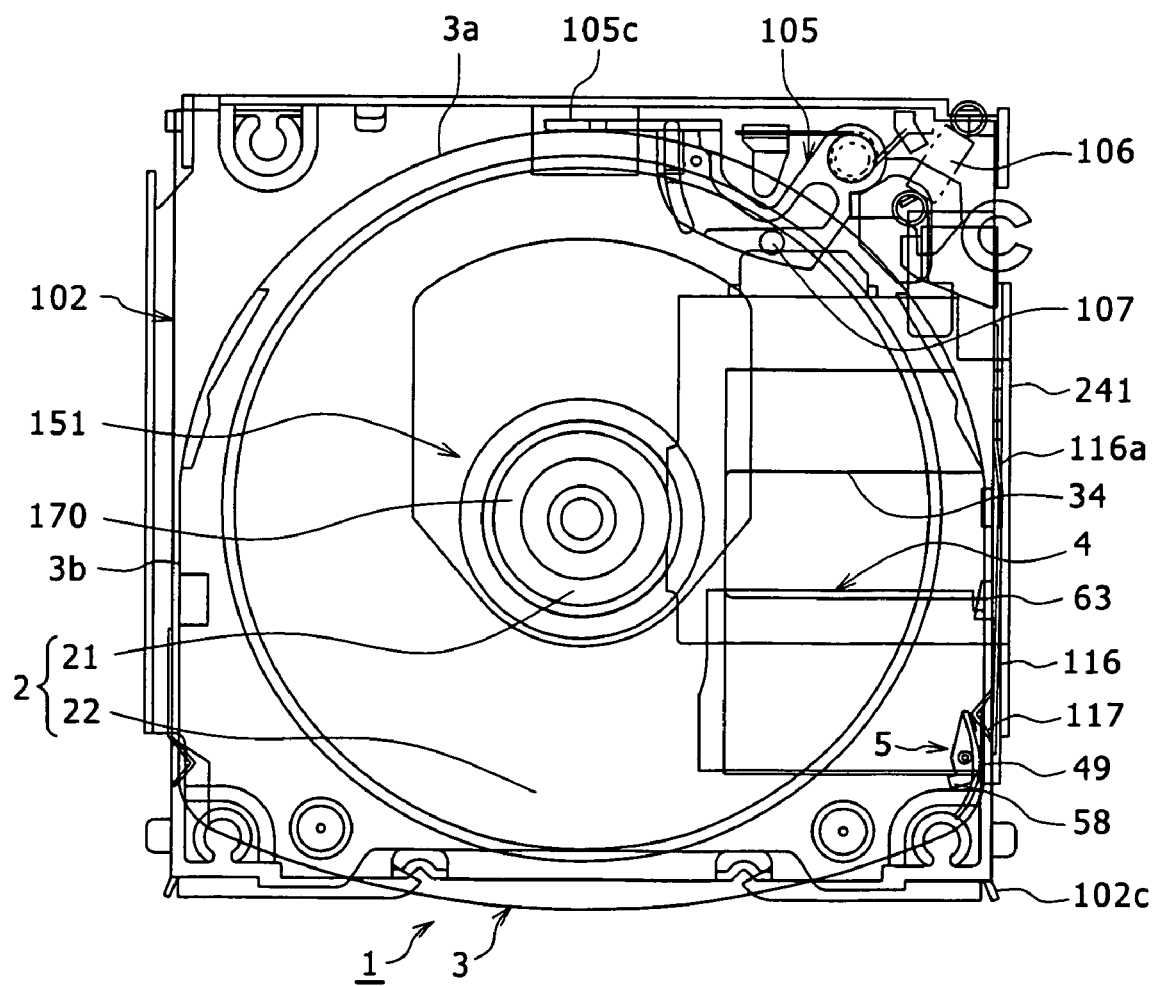
FIG. 29B is a plan view showing the same.

When the disk cartridge 1 is entirely contained in the cartridge holder 102, the eject lever 105 is locked to be incapable of returning turning by the eject lever locking device 107, as shown in FIGS. 29A and 29B.

Then, the cartridge holder 102 is moved from the cartridge insertion/draw-out position to the recording/reproduction position, and recording and/or reproduction is performed. At the time of moving the cartridge holder 102 from the cartridge insertion/draw-out position to the recording/reproduction position, the side surface 105m of the operated portion 105e of the eject lever 105 makes contact with the inclined surface portion 108e of the unlocking device 108 to flex the elastic piece portion 108c in the so-called escaping direction. Then, when an end portion of the inclined surface portion 108e is moved to the position of the operated portion 105e of the eject lever 105, the contact between the inclined surface portion 108e and the side surface 105m of the operated portion 105e of the eject lever 105 is canceled, the elastic piece portion 108c is elastically returned, and the engagement portion 108f is engaged with the lower surface 105n of the operated portion 105e of the eject lever 105.

When the cartridge holder 102 is moved to the cartridge insertion/draw-out position after the recording and/or reproduction on the disk cartridge 1 is finished, the lower surface 105n of the operated portion 105e of the eject lever 105 is lifted up by the engagement portion 108f, and the locking of the eject lever 105 by the eject lever locking device 107 is canceled, as shown in FIG. 8. Then, the disk cartridge 1 is gradually pushed out of the cartridge holder 102; in this case, as shown in FIGS. 30 and 31, until the cartridge holder 102 is turned by the predetermined angle θ1 from the recording/reproduction position toward the disk cartridge insertion/draw-out position, the movement of the shutter unlocking member 116 away from the second side plate 102c of the cartridge holder 102 is restricted by the shutter unlocking member movement restriction portion 241, and the condition where the projected portion 117 has entered into the disk cartridge 1 is maintained. This results in that the so-called braking is applied to the discharge of the disk cartridge 1, and the disk cartridge 1 is inhibited from flying out of the cartridge holder 102. Then, when the cartridge holder 102 is turned further, the shutter unlocking member 116 is released from the restraint by the shutter unlocking member movement restriction portion 241, to move in an escaping manner, resulting in that the projected portion 117 has come out of the disk cartridge 1, as shown in FIG. 32.

It should be understood by those skilled in the art that various modifications, combinations, sub-combinations and alterations may occur depending on design requirements and other factors insofar as they are within the scope of the appended claims or the equivalents thereof.

What is claimed is:

1. A recording and/or reproduction apparatus comprising:
   a chassis;
   a recording and/or reproduction section provided on said chassis so as to perform recording and/or reproduction on a disk cartridge;
   a cartridge holder for holding said disk cartridge, said cartridge holder being supported to be movable between a disk cartridge insertion/draw-out position and a recording/reproduction position relative to said chassis;
   an eject lever provided to be movable in the direction for insertion and draw-out of said disk cartridge relative to said chassis;
   a biasing section for biasing said eject lever in a disk cartridge discharging direction;
   a shutter unlocking member mounted to one side surface of said cartridge holder; and a shutter unlocking member movement restriction portion provided on said chassis and operable to restrict said shutter unlocking member from moving in the direction of spacing away from said one side surface when said cartridge holder is located in said recording/reproduction position.

2. The recording and/or reproduction apparatus according to claim 1, wherein when said cartridge holder is moved to said insertion/draw-out position, said shutter unlocking member is moved to a position where the restriction of the movement in the direction of spacing away from said one side surface by said shutter unlocking member movement restriction portion is cancelled.

3. The recording and/or reproduction apparatus according to claim 1, wherein said cartridge holder is provided to be turnable relative to said chassis, and during when said cartridge holder is turned from said recording/reproduction position to said insertion/draw-out position, the movement of said shutter unlocking member in the direction of spacing away from said one side surface is restricted by said shutter unlocking member movement restriction portion.

4. The recording and/or reproduction apparatus according to claim 1, wherein when said cartridge holder is moved from said recording/reproduction position to said insertion/draw-out position, said eject lever is moved in said discharging direction by a biasing force of said biasing section, and said disk cartridge held by said cartridge holder is discharged by said eject lever.

5. The recording and/or reproduction apparatus according to claim 1, wherein said shutter unlocking member is provided at its tip end with a projected portion configured to enter into the inside of said cartridge holder, and said shutter unlocking member movement restriction portion restricts said projected portion of said shutter unlocking member into the position in the inside of said cartridge holder when said cartridge holder is located in said recording/reproduction position.

6. The recording and/or reproduction apparatus according to claim 1, wherein an opening portion is provided, and, when said disk cartridge having a shutter member for opening and closing said opening portion is inserted into said cartridge holder, said projected portion is moved in an outward direction relative to said cartridge holder by a side surface of said disk cartridge and is thereafter fitted into said opening portion formed in a side surface of said disk cartridge to thereby cancel the shutter lock of said disk cartridge.

7. The recording and/or reproduction apparatus according to claim 1, wherein a plane formed by the shutter unlocking member and a plane formed by the shutter unlocking member movement restriction portion are different from each other and are substantially parallel to each other and a side surface of the chassis.

* * * * *